(12) United States Patent
Nonaka et al.

(10) Patent No.: US 10,941,068 B2
(45) Date of Patent: Mar. 9, 2021

(54) GLASS PANEL UNIT MANUFACTURING METHOD, BUILDING COMPONENT MANUFACTURING METHOD, GLASS PANEL UNIT MANUFACTURING SYSTEM, AND GLASS PANEL UNIT

(71) Applicant: Panasonic Intellectual Property Management Co., Ltd., Osaka (JP)

(72) Inventors: Masataka Nonaka, Osaka (JP); Eiichi Uriu, Osaka (JP); Takeshi Shimizu, Toyama (JP); Haruhiko Ishikawa, Osaka (JP); Kazuya Hasegawa, Osaka (JP); Tasuku Ishibashi, Osaka (JP); Hiroyuki Abe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 288 days.

(21) Appl. No.: 16/089,565

(22) PCT Filed: Mar. 27, 2017

(86) PCT No.: PCT/JP2017/012353
§ 371 (c)(1),
(2) Date: Sep. 28, 2018

(87) PCT Pub. No.: WO2017/170379
PCT Pub. Date: Oct. 5, 2017

(65) Prior Publication Data
US 2020/0300030 A1  Sep. 24, 2020

(30) Foreign Application Priority Data

Mar. 31, 2016  (JP) .............................. JP2016-072500

(51) Int. Cl.
*E06B 3/677* (2006.01)
*C03B 23/24* (2006.01)
(Continued)

(52) U.S. Cl.
CPC ........ *C03B 23/245* (2013.01); *C03B 23/0086* (2013.01); *C03B 23/0093* (2013.01);
(Continued)

(58) Field of Classification Search
CPC .. E06B 3/6775; E06B 3/6612; E06B 3/66304; E06B 3/67334; E06B 3/677;
(Continued)

(56) References Cited

U.S. PATENT DOCUMENTS 4,159,075 A  6/1979 Ljung et al.
6,676,786 B1  1/2004 Collins et al.
(Continued)

FOREIGN PATENT DOCUMENTS

CN  103930269 A  7/2014
EP  1216971 A1  6/2002
(Continued)

OTHER PUBLICATIONS

Machine Translation of PCT WO 2008/004709, Date Unknown.*
(Continued)

*Primary Examiner* — Jeffry H Aftergut
(74) *Attorney, Agent, or Firm* — McDermott Will & Emery LLP

(57) ABSTRACT

A glass panel unit manufacturing method includes a bonding step, a pressure reducing step, and a sealing step. The bonding step includes bonding together a first substrate and a second substrate with a first sealant to create an inner space. The pressure reducing step includes producing a reduced pressure in the inner space through an exhaust port that the first substrate has. The sealing step includes irradi- (Continued)

ating a second sealant, inserted into the exhaust port, with an infrared ray through a region, where a low emissivity film is nonexistent, of the second substrate.

7 Claims, 17 Drawing Sheets

(51) Int. Cl.

| | |
|---|---|
| *C03C 27/06* | (2006.01) |
| *E06B 3/66* | (2006.01) |
| *E06B 3/663* | (2006.01) |
| *E06B 3/673* | (2006.01) |
| *C03B 23/00* | (2006.01) |
| *E06B 3/667* | (2006.01) |

(52) U.S. Cl.
CPC ............ *C03C 27/06* (2013.01); *E06B 3/6612* (2013.01); *E06B 3/66304* (2013.01); *E06B 3/677* (2013.01); *E06B 3/6775* (2013.01); *E06B 3/67334* (2013.01); *E06B 3/667* (2013.01); *E06B 2003/66338* (2013.01)

(58) Field of Classification Search
CPC ........... E06B 3/667; E06B 2003/66338; C03C 27/06; C03B 23/245; C03B 23/0086; C03B 23/0093; Y02B 80/22; Y02A 30/249
See application file for complete search history.

(56) References Cited

U.S. PATENT DOCUMENTS

| | | | |
|---|---|---|---|
| 6,830,791 B1 | 12/2004 | Misonou et al. | |
| 2002/0121111 A1 | 9/2002 | Yoshizawa et al. | |
| 2003/0073372 A1* | 4/2003 | Nakatake | H01J 9/241 445/25 |
| 2005/0217319 A1* | 10/2005 | Yoshizawa | E06B 3/66304 65/34 |
| 2009/0151853 A1* | 6/2009 | Cooper | E06B 3/6775 156/104 |
| 2009/0155500 A1* | 6/2009 | Cooper | E06B 3/677 428/34 |
| 2009/0320921 A1 | 12/2009 | Grommesh et al. | |
| 2012/0247063 A1 | 10/2012 | Grzybowski et al. | |
| 2014/0272208 A1 | 9/2014 | Song et al. | |
| 2015/0068666 A1 | 3/2015 | Abe et al. | |
| 2017/0191305 A1 | 7/2017 | Trpkovski | |
| 2018/0320436 A1 | 11/2018 | Abe et al. | |

FOREIGN PATENT DOCUMENTS

| | | | |
|---|---|---|---|
| EP | 1642872 A1 | | 4/2006 |
| EP | 3170800 A1 | | 5/2017 |
| JP | H11-247538 A | | 9/1999 |
| JP | 2000-087656 A | | 3/2000 |
| JP | 2001-031449 A | | 2/2001 |
| JP | 2001-354456 A | | 12/2001 |
| JP | 2002-012455 A | | 1/2002 |
| JP | 2002-137940 A | | 5/2002 |
| JP | 2004-193086 A | * | 7/2004 |
| JP | 2005-139055 A | | 6/2005 |
| WO | 9748650 A1 | | 12/1997 |
| WO | 2004048286 A1 | | 6/2004 |
| WO | WO2008/004709 A1 | * | 1/2008 |
| WO | 2013/008724 A1 | | 1/2013 |
| WO | 2013/172033 A1 | | 11/2013 |
| WO | 2016009949 A1 | | 1/2016 |
| WO | 2017028870 A1 | | 2/2017 |

OTHER PUBLICATIONS

Extended European Search Report issued in corresponding European Patent Application No. 17774916.5, dated Feb. 15, 2019.
Extended European Search Report issued in corresponding European Patent Application No. 17774915.7, dated Feb. 15, 2019.
Extended European Search Report issued in corresponding European Patent Application No. 17774617.9, dated Feb. 18, 2019.
Extended European Search Report issued in corresponding European Patent Application No. 17774917.3, dated Mar. 22, 2019.
International Search Report issued in Application No. PCT/JP2017/012354 dated May 30, 2017, with English translation.
International Search Report issued in Application No. PCT/JP2017/012352 dated May 30, 2017, with English translation.
International Search Report issued in Application No. PCT/JP2017/011587 dated May 30, 2017, with English translation.
International Search Report issued in Application No. PCT/JP2017/012353 dated May 30, 2017, with English translation.
U.S. Office Action issued in corresponding U.S. Appl. No. 16/084,782, dated Jul. 30, 2020.
U.S. Office Action issued in corresponding U.S. Appl. No. 16/084,822, dated Jul. 27, 2020.
"Infared Basics," Protherm, Feb. 28, 2014, 4pages, https://www.pro-therm.com/Infared_basics.php.
Hwang, J.S., "Soldering Methodologies," Solder Paste in Electronics Packing: Springer, Boston, MA, 1992, pp. 183-221.

* cited by examiner

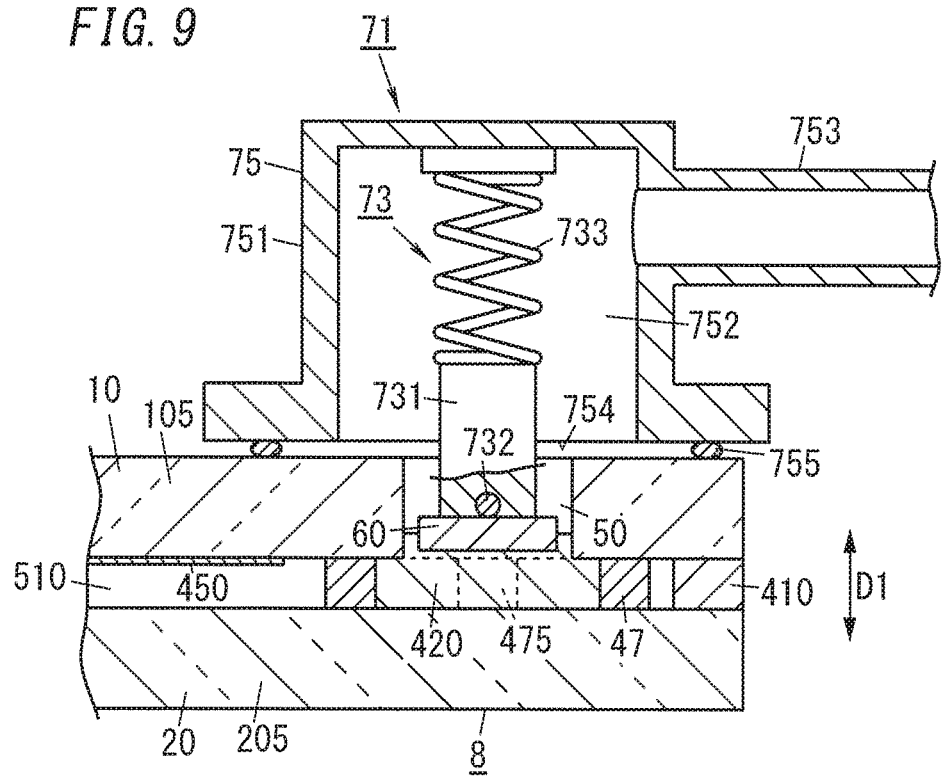
FIG. 9
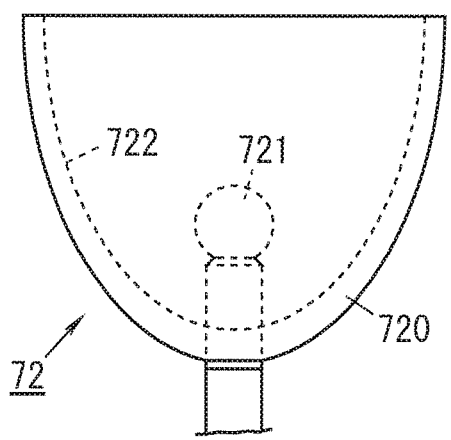

FIG. 10
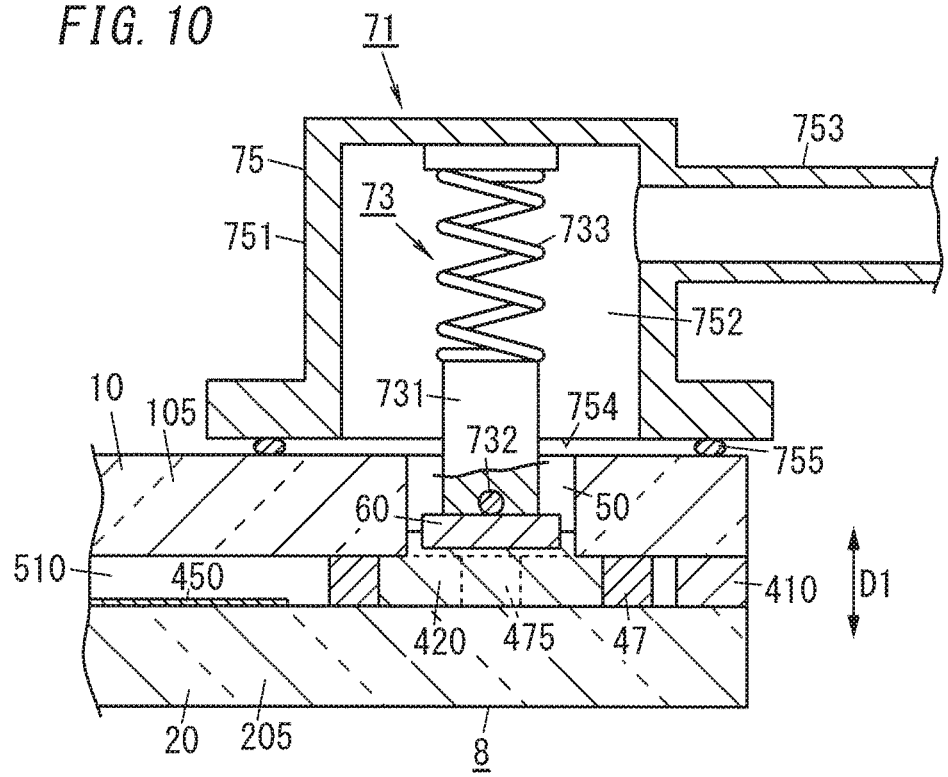
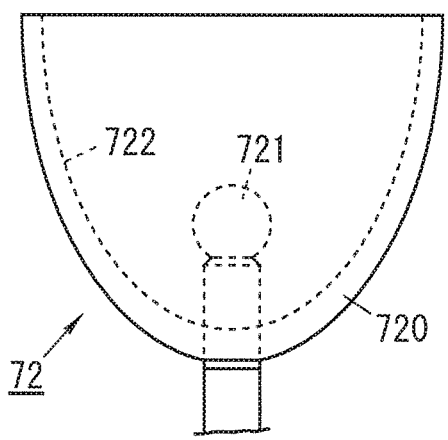

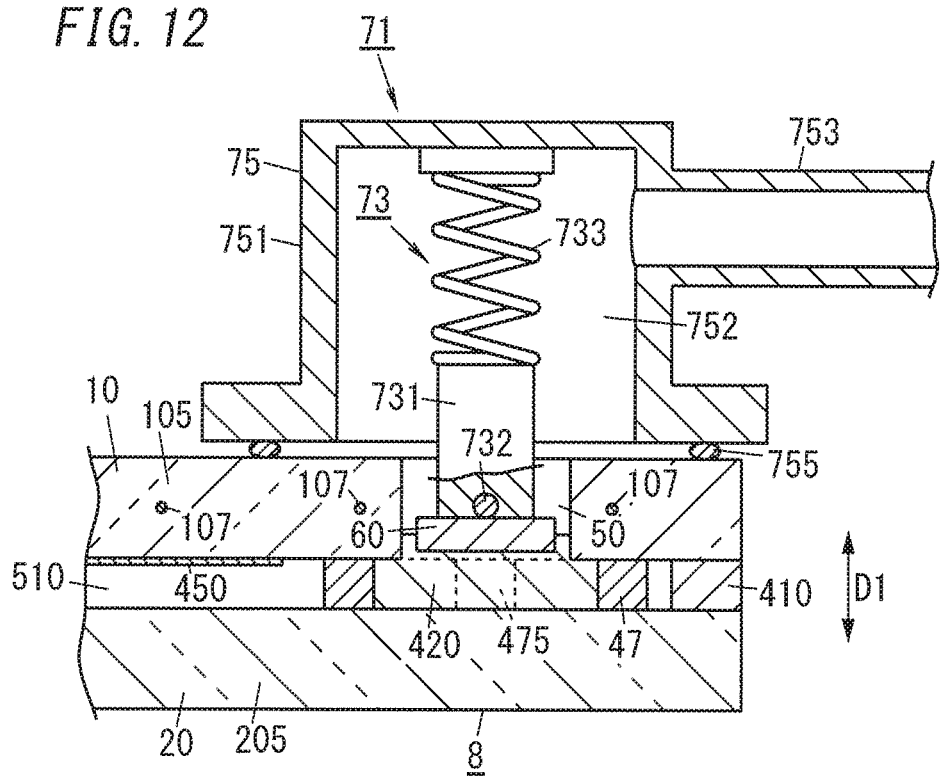
FIG. 12
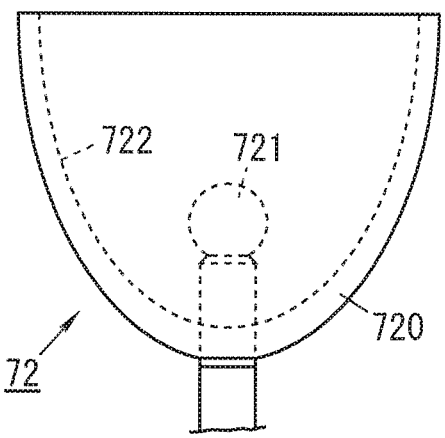

GLASS PANEL UNIT MANUFACTURING METHOD, BUILDING COMPONENT MANUFACTURING METHOD, GLASS PANEL UNIT MANUFACTURING SYSTEM, AND GLASS PANEL UNIT

RELATED APPLICATIONS

This application is the U.S. National Phase under 35 U.S.C. § 371 of International Application No. PCT/JP2017/012353, filed on Mar. 27, 2017, which in turn claims the benefit of Japanese Application No. 2016-072500, filed on Mar. 31, 2016, the disclosures of which are incorporated in their entirety by reference herein.

TECHNICAL FIELD

The present disclosure relates to a glass panel unit having an inner space at a reduced pressure and a building component including the glass panel unit, and more particularly relates to a technique for manufacturing a glass panel unit with an exhaust port, which has been used to reduce the pressure in the inner space, sealed up.

BACKGROUND ART

A thermally insulating glass panel unit is obtained by reducing the pressure in an inner space between a pair of substrates that are arranged to face each other and hermetically sealing the inner space while maintaining the reduced pressure there.

Patent Literature 1 discloses a technique according to which an exhaust pipe of glass is connected to an exhaust port that one of a pair of substrates has, the pressure in the inner space is reduced through the exhaust pipe, and then the exhaust pipe is heated and cut off.

In a glass panel unit manufactured by this technique, however, traces of the exhaust pipe cut off are left protruding from the outer surface of the glass panel unit.

CITATION LIST

Patent Literature

Patent Literature 1: JP 2001-354456 A

SUMMARY

It is therefore an object of the present disclosure to provide a glass panel unit having an inner space at a reduced pressure, and a building component including the glass panel unit, such that no traces of the exhaust pipe are left on their outer surface.

A glass panel unit manufacturing method according to an aspect of the present disclosure includes an arrangement step, a bonding step, a pressure reducing step, and a sealing step.

The arrangement step includes stacking a first substrate, including a glass pane, and a second substrate, including a glass pane, one upon the other with a first sealant in a frame shape interposed between them.

The bonding step includes bonding together the first substrate and the second substrate with the first sealant to create an inner space surrounded with the first sealant between the first substrate and the second substrate.

The pressure reducing step includes producing a reduced pressure in the inner space through an exhaust port that the first substrate has.

The sealing step includes sealing the exhaust port up while maintaining the reduced pressure in the inner space.

The sealing step includes irradiating, with a low emissivity film facing the inner space, a second sealant, inserted into the exhaust port, with an infrared ray to locally heat the second sealant and seal the exhaust port up with the second sealant that has melted. The low emissivity film is further included in either the first substrate or the second substrate. The infrared ray is externally incident through the second substrate to irradiate the second sealant through a region, where the low emissivity film is nonexistent, of the second substrate.

A building component manufacturing method according to another aspect of the present disclosure includes an assembling step of fitting a building component frame into either the glass panel unit or a cut piece thereof.

A glass panel unit manufacturing system according to still another aspect of the present disclosure is configured to manufacture a glass panel unit out of a work in progress, having an inner space and an exhaust port communicating with the inner space, by sealing the exhaust port up while maintaining a reduced pressure in the inner space.

The work in progress includes: a first substrate including a glass pane and having the exhaust port; and a second substrate including a glass pane. The first substrate and the second substrate are bonded together with a first sealant in a frame shape. The inner space is created between the first substrate and the second substrate so as to be surrounded with the first sealant. A low emissivity film is further included in either the first substrate or the second substrate and arranged to face the inner space.

The system includes: a pressure reducing mechanism configured to maintain the reduced pressure in the inner space through the exhaust port; and an irradiator configured to irradiate a second sealant, inserted into the exhaust port, with an infrared ray through a region, where the low emissivity film is nonexistent, of the second substrate.

A glass panel unit according to still another aspect of the present disclosure includes a first panel, a second panel, a first sealing portion in a frame shape, an exhaust port, and a second sealing portion.

The first panel includes a glass pane.

The second panel includes a glass pane and is arranged to face the first panel.

The first sealing portion hermetically bonds together respective peripheral portions of the first panel and the second panel.

The exhaust port is provided for the first panel.

The second sealing portion seals the exhaust port up to create an inner space, having a reduced pressure and surrounded with the first sealing portion, between the first panel and the second panel.

Either the first panel or the second panel further includes a low emissivity film facing the inner space. The second sealing portion is bonded onto a region, where the low emissivity film is nonexistent, of the glass pane of the first panel, and onto a region, where the low emissivity film is nonexistent, of the glass pane of the second panel.

BRIEF DESCRIPTION OF DRAWINGS

FIG. 9 is a partially cutaway side view illustrating how the process is progressing in a sealing step during the manufacturing of the glass panel unit;

FIG. 10 is a partially cutaway side view illustrating how the process is progressing in a sealing step during the manufacturing of a glass panel unit according to a first variation;

FIG. 12 is a partially cutaway side view illustrating how the process is progressing in a sealing step during the manufacturing of a glass panel unit according to a second variation;

DESCRIPTION OF EMBODIMENTS

Glass Panel Unit

A configuration for a glass panel unit according to an exemplary embodiment will be described with reference to the accompanying drawings. Note that on those drawings, respective constituent members of a glass panel unit according to the exemplary embodiment are depicted only schematically. That is to say, the dimensions and shapes of those constituent members illustrated on those drawings are different from actual ones.

Figure 1:
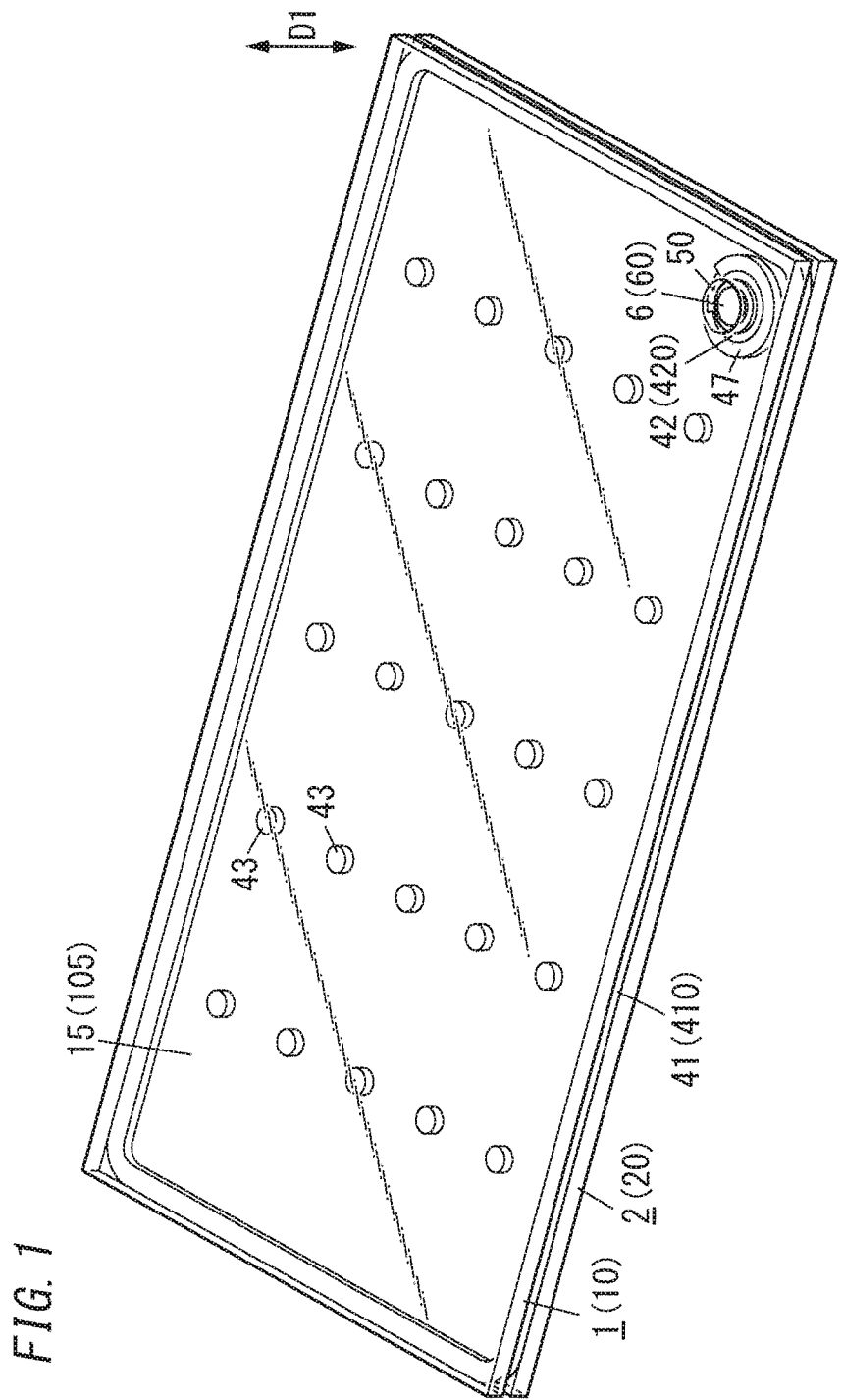
FIG. 1 is a perspective view of a glass panel unit according to an exemplary embodiment.
Figure 2:
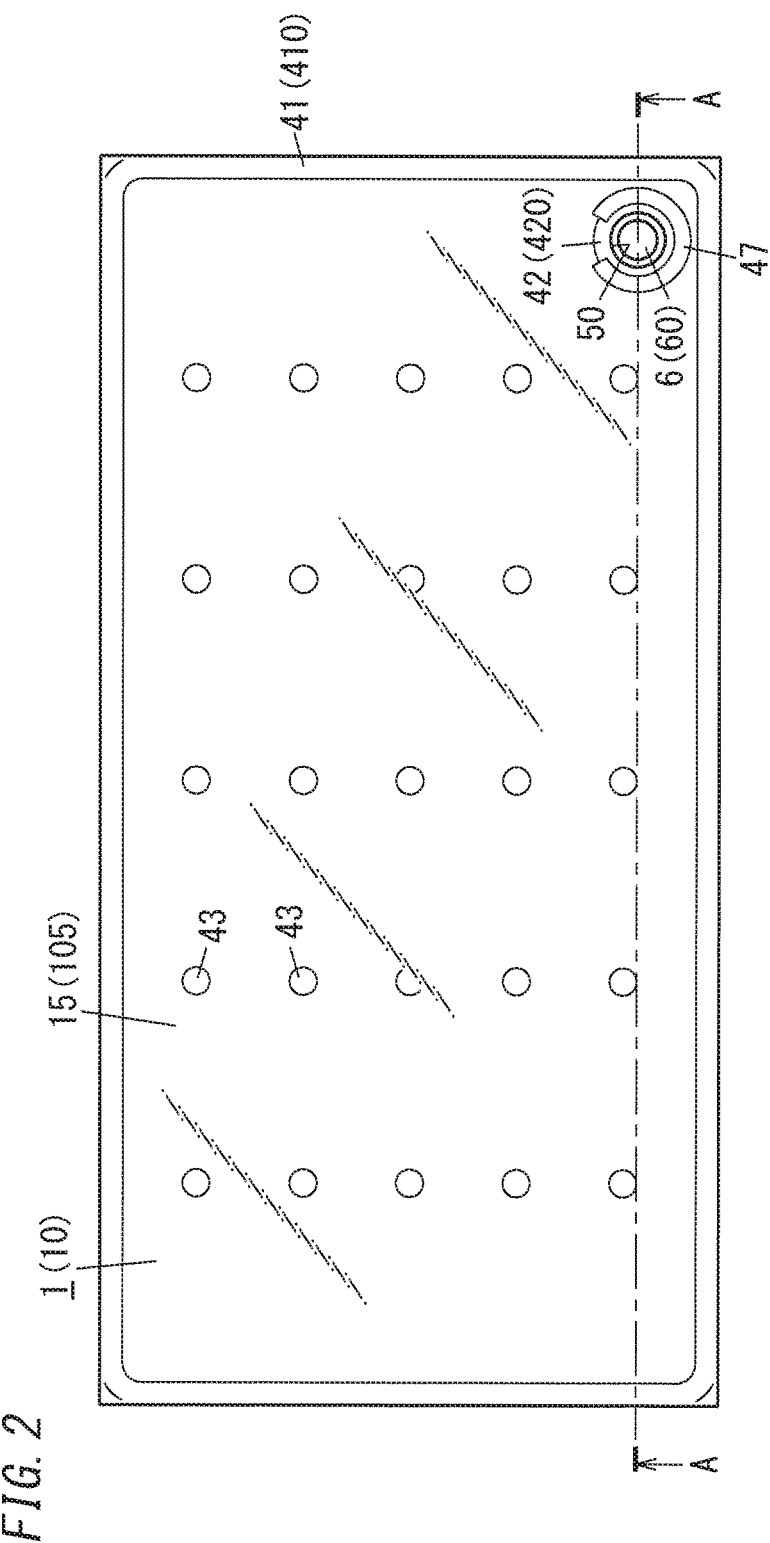
FIG. 2 is a plan view of the glass panel unit.
Figure 3:
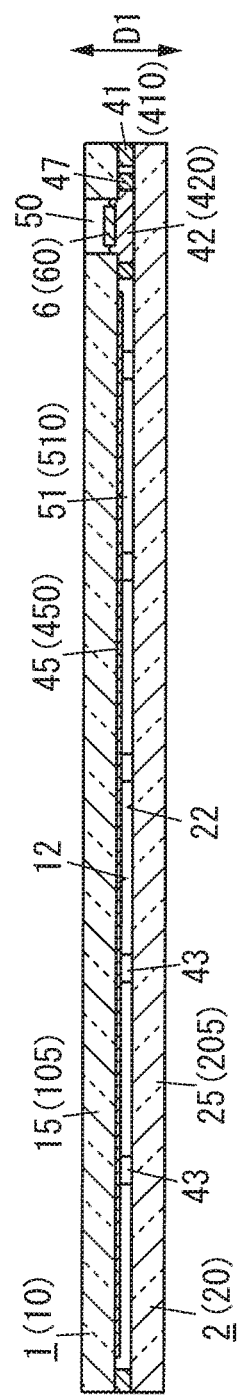
FIG. 3 is a cross-sectional view thereof taken along the plane A-A shown in FIG. 2.

As shown in FIGS. 1-3, a glass panel unit according to this exemplary embodiment includes a first panel 1, a second panel 2, a first sealing portion 41, a second sealing portion 42, a plate 6, a plurality of (or multiple) spacers 43, and a dam 47.

The first panel 1 and the second panel 2 are arranged to face each other with a narrow gap left between them. The first panel 1 and the second panel 2 are parallel to each other. Between the first panel 1 and the second panel 2, located are the first sealing portion 41, the second sealing portion 42, the plurality of spacers 43, and the dam 47.

The first panel 1 includes a glass pane 15 and a low emissivity film 45 (see FIG. 3) stacked on the glass pane 15. The low emissivity film 45 is a film containing a metal with low emissivity such as silver and has the capability of reducing the transfer of heat due to radiation. The second panel 2 includes a glass pane 25.

In the following description, the glass pane 15 will be hereinafter referred to as a "first glass pane 15" and the glass pane 25 will be hereinafter referred to as a "second glass pane 25." The first glass pane 15 and the second glass pane 25 may be configured as any of various types of glass panes made of soda lime glass, high strain point glass, chemically tempered glass, alkali-free glass, quartz glass, Neoceram, thermally tempered glass, or any other suitable glass.

Most of a counter surface 12, facing the second panel 2, of the first panel 1 is constituted of the surface of the low emissivity film 45. Most of a counter surface 22, facing the first panel 1, of the second panel 2 is constituted of the surface of the second glass pane 25.

The first sealing portion 41 is formed in a frame shape and may be made of a glass frit, for example. The first sealing portion 41 is hermetically bonded to respective peripheral portions of the first and second panels 1 and 2. In other words, the respective peripheral portions of the first and second panels 1 and 2 are hermetically bonded together with the first sealing portion 41.

The plurality of spacers 43 are dispersed so as to be spaced apart from each other. Each of the spacers 43 is arranged in contact with both of the respective counter surfaces 12 and 22 of the first and second panels 1 and 2 (see FIG. 3).

The plurality of spacers 43 are arranged so as to be surrounded with the first sealing portion 41 in the frame shape. The plurality of spacers 43 has the capability of keeping a predetermined gap between the first and second panels 1 and 2. The plurality of spacers 43 are suitably either transparent or semi-transparent. The material, dimensions, shape, arrangement pattern, and other parameters of the plurality of spacers 43 may be determined appropriately.

In the glass panel unit according to this exemplary embodiment, an exhaust port 50 is provided for the first panel 1, out of the two panels 1 and 2 (namely, the first and second panels 1 and 2). The exhaust port 50 will be used to exhaust the gas in a step (i.e., a pressure reducing step to be described later) during the manufacturing process of the glass panel unit according to this exemplary embodiment. The exhaust port 50 penetrates through the first panel 1 in a thickness direction D1. As used herein, the "thickness direction D1" is defined along the thickness of the glass panel unit according to this exemplary embodiment, the thickness of the first panel 1, and the thickness of the second panel 2.

The exhaust port 50 is sealed hermetically with the second sealing portion 42. The second sealing portion 42 may be made of a glass frit, for example.

The inner space 51, surrounded with the first panel 1, the second panel 2, and the first sealing portion 41, is sealed hermetically by sealing up the exhaust port 50 communicating with the inner space 51. The hermetically sealed inner space 51 may be a thermally insulated space, of which the pressure has been reduced to a degree of vacuum of 0.1 Pa or less, for example.

A plate 6 is arranged in the exhaust port 50. The plate 6 has an outside diameter, which is smaller by one step than the diameter of the exhaust port 50. The plate 6 may be made of a metal, for example.

The plate 6 is located opposite from the second panel 2 with respect to the second sealing portion 42. The plate 6 is a member that will be used to apply pressure to a second sealant 420 in a step (i.e., a sealing step to be described later) during the manufacturing process of the glass panel unit according to this exemplary embodiment.

It is recommended that the exhaust port 50 be further stuffed with resin such that the plate 6 is covered with the stuffing resin. This allows the exhaust port 50 to be protected and eliminates a recess from the surface of the glass panel unit.

In the inner space 51, the second sealing portion 42 is bonded with high bond strength onto the respective counter surfaces 12 and 22 of the first and second panels 1 and 2.

The low emissivity film 45, stacked on one surface (facing the second panel 2) of the first glass pane 15 in the thickness direction D1, is arranged to face the inner space 51. The low emissivity film 45 is not stacked to cover the one surface of the first glass pane 15 entirely. That is to say, portions of the one surface of the first glass pane 15 are not covered with the low emissivity film 45. Portions, not covered with the low emissivity film 45, of the one surface of the first glass pane 15 include a portion to be bonded to the first sealing portion 41 and another portion to be bonded to the second sealing portion 42 and the dam 47. The latter portion, which will be bonded to the second sealing portion 42 and the dam 47, of the one surface of the glass pane 15 is a circumferential portion surrounding an opening formed by the exhaust port 50.

That is to say, all of the first sealing portion 41, the second sealing portion 42, and the dam 47 are hermetically bonded onto the surface of the first glass pane 15 included in the first panel 1 and the surface of the second glass pane 25 included in the second panel 2.

The first sealing portion 41 is hermetically bonded to a peripheral portion of the one surface of the first glass pane 15 and a peripheral portion of one surface of the second glass pane 25. The second sealing portion 42 is hermetically bonded to a circumferential portion, surrounding the exhaust port 50, of the one surface of the first glass pane 15 and a portion, facing the exhaust port 50 and its circumferential portion, of the one surface of the second glass pane 25.

The dam 47 may be made of a glass frit, for example, and may be formed in the shape of a partially cut-out ring. For example, the dam 47 may have a C-shape. The dam 47 is suitably made of the same material as the first sealing portion 41 and suitably made of the same material as the spacers 43 as well.

The dam 47 is arranged in the inner space 51 so as to surround the opening formed by, the exhaust port 50. The dam 47 may be bonded to all of the first panel 1 (first glass pane 15), the second panel 2 (second glass pane 25), and the second sealing portion 42. Alternatively, the dam 47 may be bonded to only one of the first and second panels 1 and 2 (e.g., to only the second panel 2). Also, the dam 47 does not have to have a ring shape but may have any other appropriate shape.

In the glass panel unit according to the exemplary embodiment with such a configuration, the inner space 51 sealed up with the first sealing portion 41 and the second sealing portion 42 is present at a reduced pressure between the first panel 1 and the second panel 2, thus allowing the glass panel unit to exhibit an excellent thermal insulation property. The second sealing portion 42 is strongly bonded, in the inner space 51, to the first panel 1 (first glass pane 15), the second panel 2 (second glass pane 25), and the dam 47. This second sealing portion 42 seals the exhaust port 50 up with high reliability.

Note that the above-described configuration is only one of various configurations that the glass panel unit according to the exemplary embodiment may have. That is to say, the glass panel unit according to the exemplary embodiment may have any other configuration.

Figure 11:
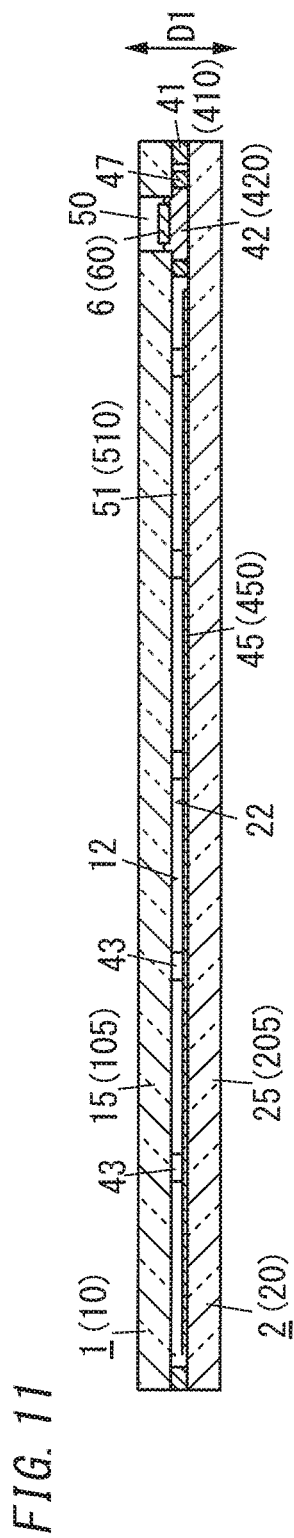
FIG. 11 is a cross-sectional view of the glass panel unit.

For example, the low emissivity film 45 may be included in the second panel 2, instead of being included in the first panel 1. In that case, as shown in FIG. 11 illustrating a first variation, the low emissivity film 45 is stacked on one surface (facing the first panel 1) of the second glass pane 25 in the thickness direction D1 and arranged to face the inner space 51. The low emissivity film 45 is not stacked to cover the one surface of the second glass pane 25 entirely. That is to say, the low emissivity film 45 is suitably partially removed from (i.e., nonexistent in) a portion to be bonded to the first sealing portion 41 and another portion to be bonded to the second sealing portion 42 and the dam 47 (i.e., a portion, facing the exhaust port 50 and its circumferential portion, of the second glass pane 25).

Figure 13:
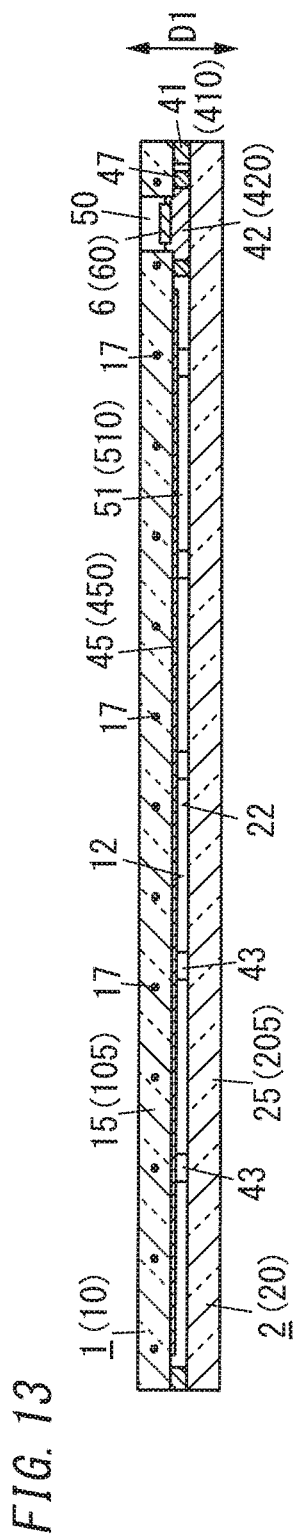
FIG. 13 is a cross-sectional view of the glass panel unit.

Also, at least one of the first glass pane 15 or the second glass pane 25 may be configured as a wired glass pane. In that case, as shown in FIG. 13 illustrating a second variation, the first glass pane 15 is suitably configured as a wired glass pane (i.e., a glass pane including a net of wires 17) and the second glass pane 25 is suitably configured as a non-wired glass pane. This configuration is suitable to prevent the net of wires 17 from interfering with the transfer of energy (i.e., radiation of an infrared ray) to heat the second sealing portion 42 in the sealing step to be described later.

Next, a manufacturing method, by which the glass panel unit according to the exemplary embodiment may be manufactured (i.e., a method using infrared radiation), will be described.

A method of manufacturing the glass panel unit according to the exemplary embodiment includes an arrangement step, a bonding step, a pressure reducing step, and a sealing step.

Figure 4:
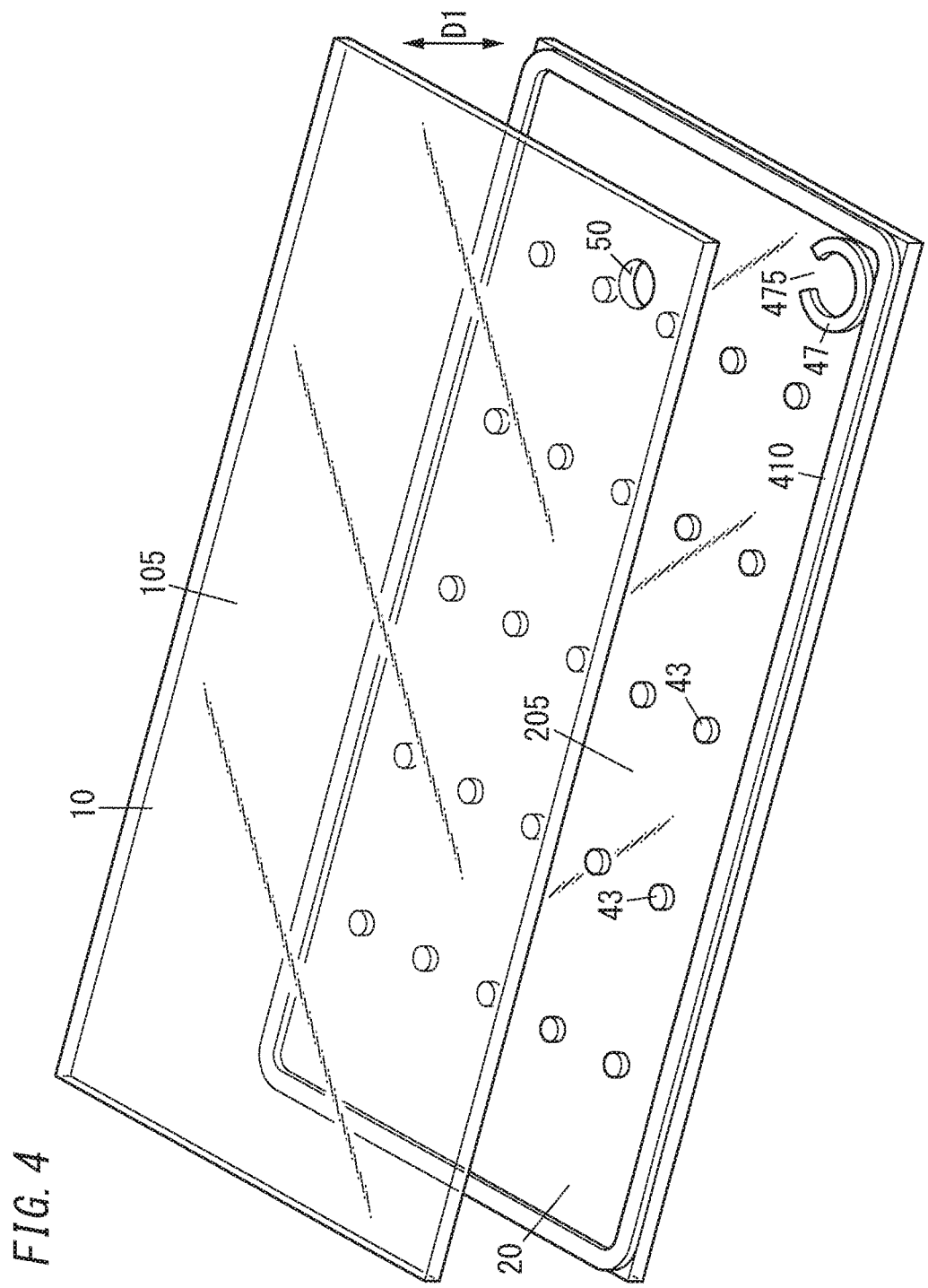
FIG. 4 is a perspective view illustrating how the process is progressing in an arrangement step during the manufacturing of the glass panel unit.
Figure 5:
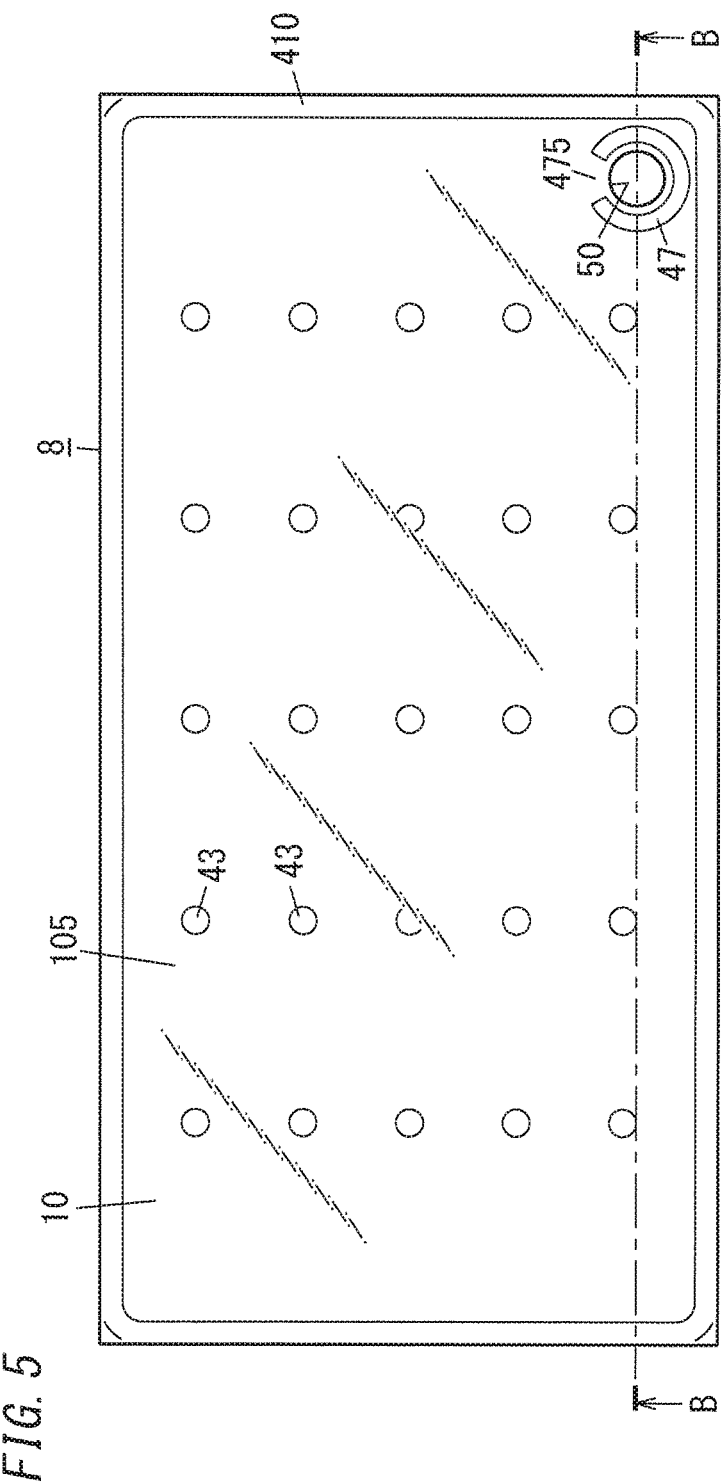
FIG. 5 is a plan view illustrating how the process is progressing in the arrangement step and a bonding step during the manufacturing of the glass panel unit.
Figure 6:
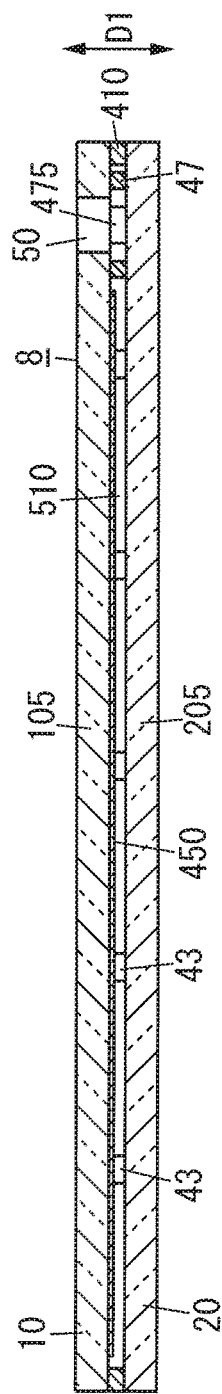
FIG. 6 is a cross-sectional view thereof taken along the plane B-B shown in FIG. 5.

In the arrangement step, a first substrate 10, a second substrate 20, a first sealant 410, a plurality of spacers 43, and a dam 47 are arranged at their respective predetermined positions as shown in FIGS. 4-6. Specifically, the first sealant 410, the plurality of spacers 43, and the dam 47 are arranged on one surface (upper surface) of the second substrate 20, and the first substrate 10 is arranged over the second substrate 20 to face the second substrate 20.

The first substrate 10 will constitute the first panel 1 of the glass panel unit to be obtained as a final product through the respective manufacturing process steps. Likewise, the second substrate 20 will constitute the second panel 2 of the glass panel unit, and the first sealant 410 will constitute the first sealing portion 41 of the glass panel unit.

The first substrate 10 includes a glass pane 105 and a low emissivity film 450 stacked on the glass pane 105. The second substrate 20 includes a glass pane 205. In the following description, the glass pane 105 will be hereinafter referred to as a "first glass pane 105" and the glass pane 205 will be hereinafter referred to as a "second glass pane 205."

The first glass pane 105 will constitute the first glass pane 15 of the glass panel unit to be obtained as a final product through the respective manufacturing process steps. Likewise, the low emissivity film 450 will constitute the low emissivity film 45 of the glass panel unit, and the second glass pane 205 will constitute the second glass pane 25 of the glass panel unit.

As shown in FIG. 6, most of the counter surface, facing the second substrate 20, of the first substrate 10 is constituted of the surface of the low emissivity film 450. The counter surface, facing the first substrate 10, of the second substrate 20 is constituted of the surface of the second glass pane 205.

The first substrate 10 (i.e., the first glass pane 105) has an exhaust port 50 penetrating through the first substrate 10 in the thickness direction D1. The low emissivity film 450 is not stacked to cover the one surface (lower surface) of the first glass pane 105 entirely, but is partially removed from the entire peripheral portion of the one surface of the first glass pane 105 and from a circumferential portion, surrounding the exhaust port 50, of the one surface of the first glass pane 105.

The job of removing the low emissivity film 450 may be carried out, before the arrangement step, with an appropriate film remover. For example, a first substrate 10 on which the low emissivity film 450 has been stacked to cover the one surface entirely may be provided, the job of partially removing the low emissivity film 450 from the first substrate 10 may be performed, and then the first substrate 10 and the second substrate 20 may be arranged to face each other in the arrangement step.

The first sealant 410 is applied in a frame shape onto the outer periphery of the one surface (upper surface) of the second substrate 20 (second glass pane 205) with an applicator such as a dispenser and then dried and pre-baked. Likewise, a material for the dam 47 is also applied in the shape of a ring with a cut 475 onto a predetermined area of the one surface (upper surface) of the second substrate 20 (second glass pane 205) with an applicator such as a dispenser and then dried and pre-baked. The first sealant 410 and the dam 47 are suitably made of the same material (such as a glass frit). The dam 47 is formed in a C-shape with the cut 475 in this embodiment, but does not have to be formed in such a shape.

The plurality of spacers 43 are arranged in a regular pattern within an area, surrounded with the first sealant 410, of the one surface of the second substrate 20. The exhaust port 50 of the first substrate 10 is arranged to face the inner peripheral surface of the dam 47 provided on the second substrate 20.

In the bonding step, the first and second substrates 10 and 20 that have been arranged at their respective predetermined positions in the arrangement step are hermetically bonded together with the first sealant 410. Specifically, the first substrate 10 and the second substrate 20, which has been loaded with the first sealant 410, the plurality of spacers 43, and the dam 47 sandwiched between them, are heated in a bonding oven such as a circulating hot air oven. As a result, the first sealant 410 and dam 47 melt under the heat to be bonded onto the first substrate 10 and the second substrate 20. The first sealant 410 and the dam 47 are bonded onto respective portions, where the low emissivity film 450 is nonexistent, of the first substrate 10. Note that in this bonding step, the dam 47 does not have to be bonded onto the first substrate 10 but may remain non-bonded to the first substrate 10.

As a result, as shown in FIG. 6 and other drawings, an inner space 510 is created between the first substrate 10 and the second substrate 20. The inner space 510 is a space surrounded with the first substrate 10, the second substrate 20, and the first sealant 410, and communicates with the outside though only the exhaust port 50. Note that since the dam 47 has the cut 475 along its circumference, the dam 47 does not cut off communication between the inner space 510 and the outside at this stage.

A work in progress 8 is obtained as a result of the arrangement step and the bonding step described above. The work in progress 8 is an intermediate product obtained during the manufacturing process of the glass panel unit according to the exemplary embodiment.

In the work in progress 8, the first substrate 10 including the glass pane 105 and having the exhaust port 50 and the second substrate 20 including the glass pane 205 are bonded together with the first sealant 410 in a frame shape. Between the first substrate 10 and the second substrate 20, the inner space 510 has been created to be surrounded with the first sealant 410. In the inner space 510, the dam 47 with the cut 475 is arranged as a ring surrounding the opening formed by the exhaust port 50. The dam 47 is hermetically bonded onto the first substrate 10 and the second substrate 20 except that cut-out portion along the circumference (i.e., the cut 475).

In the embodiment described above, the dam 47 has only one cut 475. However, this is only an example and should not be construed as limiting. Alternatively, the dam 47 may have a plurality of cuts that are spaced apart from each other along the circumference of the dam 47 or may have any other configuration without limitation. Also, in the embodiment described above, the cut 475 is formed to divide the dam 47. However, the cut 475 may also be formed so as not to divide the dam 47. For example, at least one circumferential portion of the dam 47 may be formed to be recessed with respect to the rest of the dam 47. The portion(s) (i.e., one or a plurality of portions recessed with respect to the other portion) may also be used as the cut(s) 475.

Subjecting this work in progress 8 to the job of sealing the exhaust port 50 while maintaining a reduced pressure in the inner space 510 completes the glass panel unit according to the exemplary embodiment. That is to say, the glass panel unit according to the exemplary embodiment is manufactured by performing the pressure reducing step and the sealing step on the work in progress 8.

Figure 7:
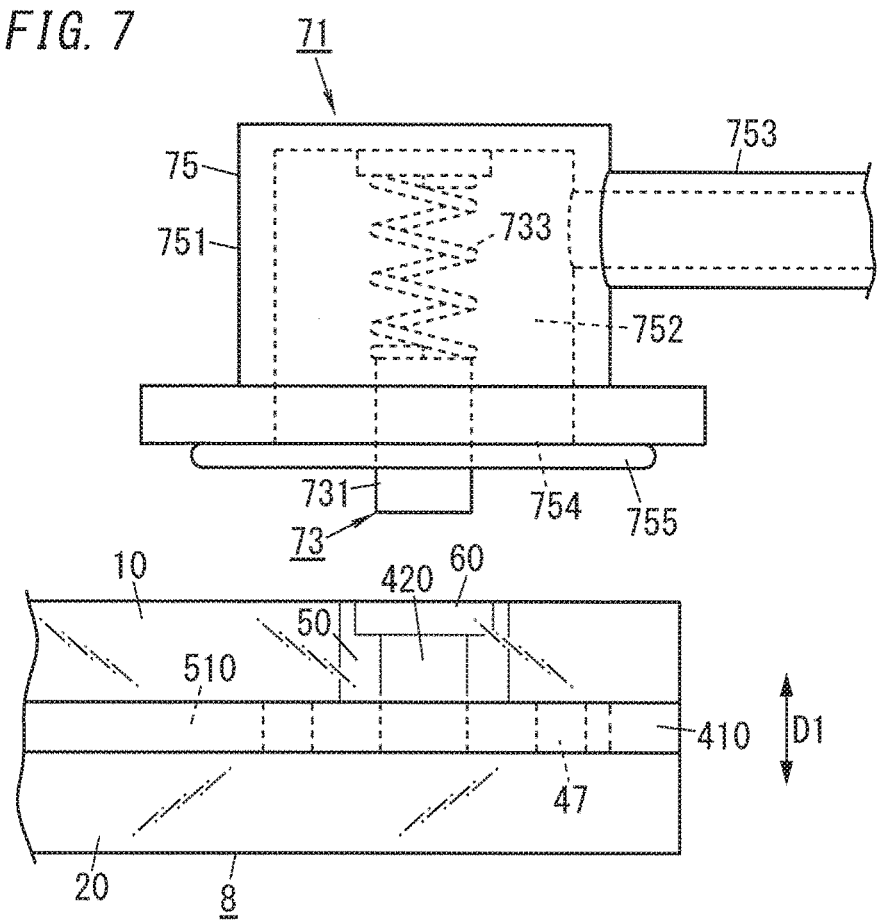
FIG. 7 is a side view illustrating how the process is progressing in a pressure reducing step during the manufacturing of the glass panel unit.
Figure 8:
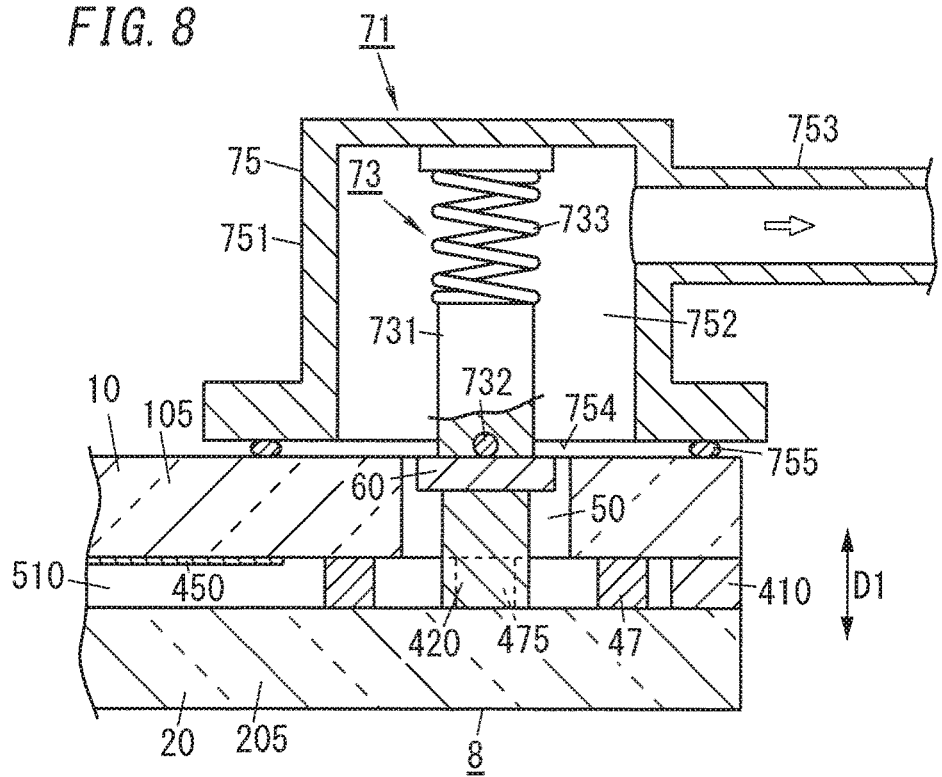
FIG. 8 is a partially cutaway side view illustrating how the process is progressing in the pressure reducing step during the manufacturing of the glass panel unit.

The pressure reducing step and the sealing step are performed in this order with the system shown in FIGS. 7-9. This system includes: a pressure reducing mechanism 71 including an exhaust head 75 to be pressed against the work in progress 8; a heating mechanism 72 (see FIG. 9) arranged opposite from the exhaust head 75 with respect to the work in progress 8; and a pressing mechanism 73 attached to the exhaust head 75.

The exhaust head 75 is configured to reduce, through the exhaust port 50, the pressure in the inner space 510 created in the work in progress 8 and maintain the reduced pressure there.

The exhaust head 75 includes a head body 751 in a cylindrical shape with a closed bottom and a connection pipe 753 extended from the head body 751. The head body 751 has a space 752 formed inside and an opening 754 to expose the space 752 to the outside. An O-ring 755 with elasticity is arranged on an area, surrounding the opening 754, of the head body 751. The connection pipe 753 is configured to allow the space 752 inside the head body 751 to directly communicate with a vacuum suction device.

The pressing mechanism 73 includes a holder 731 in a block shape and a spring 733 coupling the holder 731 onto an internal bottom face of the head body 751. The spring 733 is located in the space 752. The pressing mechanism 73 is configured to press, in a state where the pressure in the inner space 510 is reduced by the pressure reducing mechanism 71, the second sealant 420 inserted into the exhaust port 50 toward the second substrate 20. Note that the pressing mechanism 73 may have any other configuration as long as the pressing mechanism 73 is able to press the second sealant 420 down toward the second substrate 20.

In the pressure reducing step, the exhaust head 75 may be used in the following manner.

First of all, as shown in FIG. 7, the work in progress 8 is loaded into the system with the opening of exhaust port 50 facing upward (such that the first substrate 10 is located over the second substrate 20). The exhaust head 75 is placed in position over the exhaust port 50 with its opening 754 facedown. This places the holder 731 in position over the exhaust port 50.

By this time, the second sealant 420 and the press member 60 have been inserted into the exhaust port 50 of the work in progress 8. The second sealant 420 may be a solid sealant of a glass frit, for example. The press member 60 may be made of a metal, for example.

The second sealant 420 and the press member 60 each have an outside diameter smaller than the diameter of the exhaust port 50. The press member 60 has a larger outside diameter than the second sealant 420. The press member 60 arranged in the exhaust port 50 is located opposite from the second substrate 20 with respect to the second sealant 420.

Next, as shown in FIG. 8, the exhaust head 75 is lowered to press the lower surface of the holder 731 against the upper surface of the press member 60. This brings the O-ring 755 of the exhaust head 75 into airtight contact with the area, surrounding the exhaust port 50 entirely, of the upper surface of the first substrate 10.

The presence of the O-ring 755, elastically deformed under the downward pressure applied from the head body 751, between the first substrate 10 and the head body 751 allows the space 752 inside the head body 751 and the exhaust port 50 to communicate with each other hermetically.

At this time, the second sealant 420 and the press member 60 mounted thereon are vertically sandwiched between the second substrate 20 and the holder 731 under the biasing force (restitution force) of the spring 733. In this pressure reducing step, the pressing mechanism 73 functions as a holding mechanism for elastically holding the second sealant 420 being inserted into the exhaust port 50.

In this state, the air inside the space 752 of the head body 751 is exhausted through the connection pipe 753 (as indicated by the open arrow in FIG. 8). Although the second sealant 420 and the press member 60 are inserted into the exhaust port 50, a gap is left between the inner peripheral face of the exhaust port 50 and the second sealant 420, a gap is also left between the exhaust port 50 and the press member 60, and these two gaps communicate with each other. This allows the air in the inner space 510 to be exhausted (e.g., allows the inner space 510 to be evacuated) through the exhaust port 50 of the first substrate 10 and the cut 475 of the dam 47 arranged in the inner space 510.

In the sealing step, the inner space 510 is sealed up with the heating mechanism 72 shown in FIG. 9 with a reduced pressure maintained in the inner space 510.

The heating mechanism 72 is configured to locally heat the second sealant 420, inserted into the exhaust port 50, by a non-contact method with the reduced pressure maintained in the inner space 510 by the pressure reducing mechanism 71.

The heating mechanism 72 includes an irradiator 720 with the ability to irradiate the target with an infrared ray. The irradiator 720 is configured to irradiate the second sealant 420, inserted into the exhaust port 50 to come into direct contact with the second substrate 20, with an infrared ray, externally incident through the second substrate 20 (second glass pane 205), and thereby locally heat the second sealant 420.

The irradiator 720 includes a heat source 721 for radiating an infrared ray and a focusing member 722 for focusing the infrared ray, radiated from the heat source 721, onto a target location. As the heat source 721, a halogen lamp for radiating a near infrared ray is suitably used. Having the heat source 721 radiate a near infrared ray with a short wavelength makes the infrared ray radiated (i.e., the near infrared ray) less easily absorbable into the glass pane (such as the second glass pane 205), which is beneficial. When the irradiator 720 is configured to radiate a near infrared ray, the second sealant 420 is suitably a black material with a high near infrared absorbance so as to achieve a near infrared absorbance of 30% or more.

When reaching a predetermined temperature, the second sealant 420 that has been heated locally melts and softens. The second sealant 420 that has softened is pressed down toward the second substrate 20 and deformed under the biasing force (spring force) applied by the spring 733 of the pressing mechanism 73 via the press member 60. The second sealant 420 is pressed and expanded perpendicularly to the thickness direction D1 and deformed to the point of coming into contact with the inner peripheral face of the dam 47 in the inner space 510. Bringing the second sealant 420 into contact with the dam 47 reduces further expansion of the second sealant 420. This allows the cut 475 of the dam 47 to be sealed up with the second sealant 420 that has been pressed and expanded to the point of coming into contact with the dam 47.

At this stage, the exhaust port 50 is sealed up with the second sealant 420, and the inner space 510 is hermetically sealed up with the reduced pressure maintained. As shown in FIG. 9, the second sealant 420 is bonded onto both of the first substrate 10 and the second substrate 20 in the inner space 510 and is bonded to the press member 60 as well.

Note that the temperature, increased by heating, of the second sealant 420 may be measured with a thermocouple 732 provided for the holder 731. The thermocouple 732 is able to measure the temperature of the press member 60. The temperature of the second sealant 420 is measured indirectly based on the temperature of the press member 60. Measuring the temperature of the second sealant 420 allows the timing of the second sealant 420 melting to be estimated, thus enabling (feedback) control of the pressure reducing mechanism 71 and the heating mechanism 72 based on this estimated timing.

The glass panel unit according to the exemplary embodiment, manufactured through these steps, has the inner space 510 at a reduced pressure, and therefore, exhibits an excellent thermal insulation property. In addition, the exhaust port 50 used for reducing the pressure is hermetically sealed up with the second sealant 420 that has melted and been deformed. Therefore, the glass panel unit according to the exemplary embodiment leaves no traces of the exhaust pipe unlike the known art. This reduces the chances of the exhaust pipe traces causing damage to the glass panel unit.

The second sealant 420 that has melted and been deformed in the sealing step will constitute the second sealing portion 42 of the glass panel unit according to the exemplary embodiment. Likewise, the press member 60 that has been used in the sealing step will constitute the plate 6 located in the exhaust port 50 to cover the second sealing portion 42 in the glass panel unit according to the exemplary embodiment.

In the glass panel unit according to the exemplary embodiment, the exhaust port 50 is provided at only one location of the first substrate 10. Alternatively, a plurality of exhaust ports 50 may be provided at multiple locations of the first substrate 10. Even in such an alternative embodiment, each of those exhaust ports 50 may still be sealed up with the second sealant 420 that has melted and been deformed under the heat by using the pressure reducing mechanism 71, heating mechanism 72, and pressing mechanism 73 described above for each of those exhaust ports 50.

Also, according to the manufacturing method described above, at the stage of the pressure reducing step (i.e., after the work in progress 8 has been formed), the exhaust head 75 is connected to the exhaust port 50 so as to communicate with the exhaust port 50. Alternatively, the exhaust head 75 may also be connected to the exhaust port 50 inside the bonding oven at the stage of the bonding step (i.e., while the work in progress 8 is still being formed) to communicate with the exhaust port 50. This enables the bonding step and the pressure reducing step (and the sealing step as well) to be performed continuously in the bonding oven. Nevertheless, to prevent the second sealant 420 from melting in the bonding step, a material having a higher melting point than the first sealant 410 is suitably used as the second sealant 420.

The melting point of the second sealant 420 is suitably higher by 30-200° C. than the melting point of the first sealant 410. If the melting point of the second sealant 420 were higher than the melting point of the first sealant 410 by over 200° C., then the chances of causing cracks in at least one of the first and second substrates 10 and 20 would increase.

Also, in the glass panel unit according to the exemplary embodiment, the press member 60 (plate 6) is left in the exhaust port 50. If necessary, the press member 60 (plate 6) may be removed after the exhaust port 50 has been sealed up.

Optionally, either a single glass panel unit or a plurality of glass panel units may be formed by further dividing the glass panel unit, formed by the manufacturing method described above, while keeping the inner space 510 hermetically sealed. In that case, a cut piece of the first substrate 10 used in the manufacturing process may constitute the first panel 1 of the glass panel unit obtained as a final product, a cut piece of the first glass pane 105 included in the first substrate 10 may constitute the first glass pane 15 of the glass panel unit, and a cut piece of the low emissivity film 450 may constitute the low emissivity film 45 of the glass panel unit. Likewise, a cut piece of the second substrate 20 may constitute the second panel 2 of the glass panel unit, a cut piece of the second glass pane 205 included in the second substrate 20 may constitute the second glass pane 25 of the glass panel unit, and a cut piece of the first sealant 410 may constitute the first sealing portion 41 of the glass panel unit.

Next, some variations (namely, first through fourth variations) of the glass panel unit according to the exemplary embodiment will be described sequentially. In the following description of variations, any constituent member having the same function as a counterpart of the exemplary embodiment described above will be designated by the same reference numeral as that counterpart's, and a detailed description thereof will be omitted herein.

First Variation

In a glass panel unit according to a first variation illustrated in FIGS. 10 and 11, the low emissivity film 450 is included in the second substrate 20 of the work in progress 8.

As shown in FIG. 10, the low emissivity film 450 is stacked on one surface (i.e., a surface facing the first substrate 10) of the second glass pane 205 in the thickness direction D1, and arranged to face the inner space 510. The low emissivity film 450 is not stacked to cover the one surface (upper surface) of the second glass pane 205 entirely, but is suitably nonexistent in a portion to be bonded to the first sealant 410 and a portion to be bonded to the second sealant 420 and the dam 47 (i.e., a portion, facing the exhaust port 50 and its circumferential portion, of the second glass pane 205).

This allows the second sealant 420, put directly on the second substrate 20, to be irradiated, in the sealing step, with an infrared ray through a region, where the low emissivity film 450 is nonexistent (i.e., a region facing the exhaust port 50 and its circumferential portion), of the second substrate 20 (see FIG. 10).

Second Variation

In a glass panel unit according to the second variation illustrated in FIGS. 12 and 13, the first glass pane 105 of the work in progress 8 is configured as a wired glass pane (i.e., a glass pane with a net of wires 107) and the second glass pane 205 is configured as a non-wired glass pane (i.e., a glass pane with no net of wires). In a method for manufacturing the glass panel unit according to the second variation, the second sealant 420 may be irradiated with an infrared ray through a member, having no net of wires 107 (i.e., the second glass pane 205), of the work in progress 8. This reduces the chances of the net of wires 107 interfering with the irradiation with the infrared ray. The net of wires 107 embedded in the first glass pane 105 will constitute the net of wires 17 (see FIG. 13) embedded in the first glass pane 15 of the glass panel unit according to the second variation.

Third Variation

Figure 14:
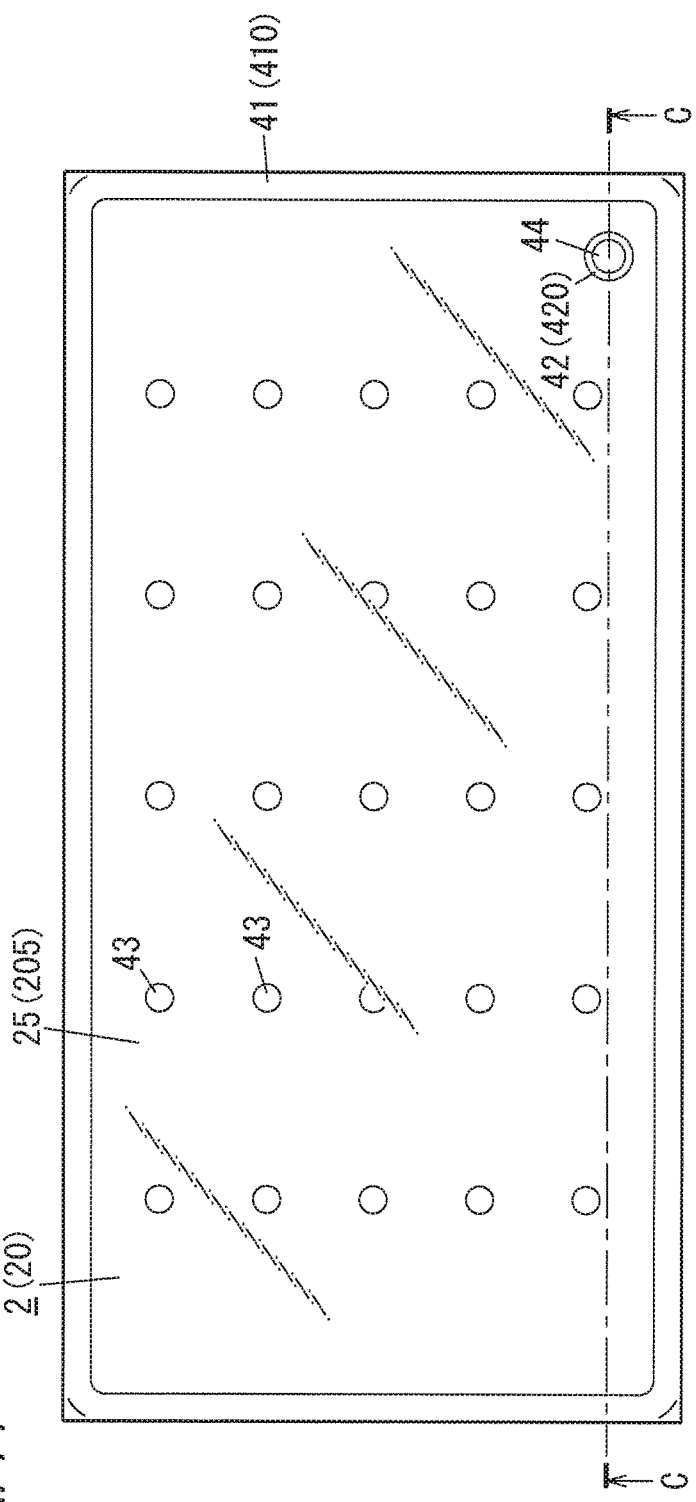
FIG. 14 is a plan view of a glass panel unit according to a third variation.
Figure 15:
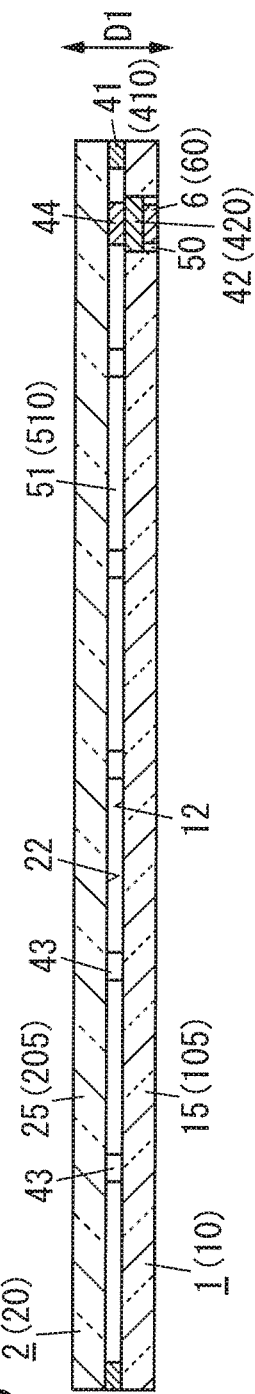
FIG. 15 is a cross-sectional view thereof taken along the plane C-C shown in FIG. 14.

A glass panel unit according to a third variation illustrated in FIGS. 14 and 15 is manufactured by a manufacturing method using inductive heating.

Figure 16:
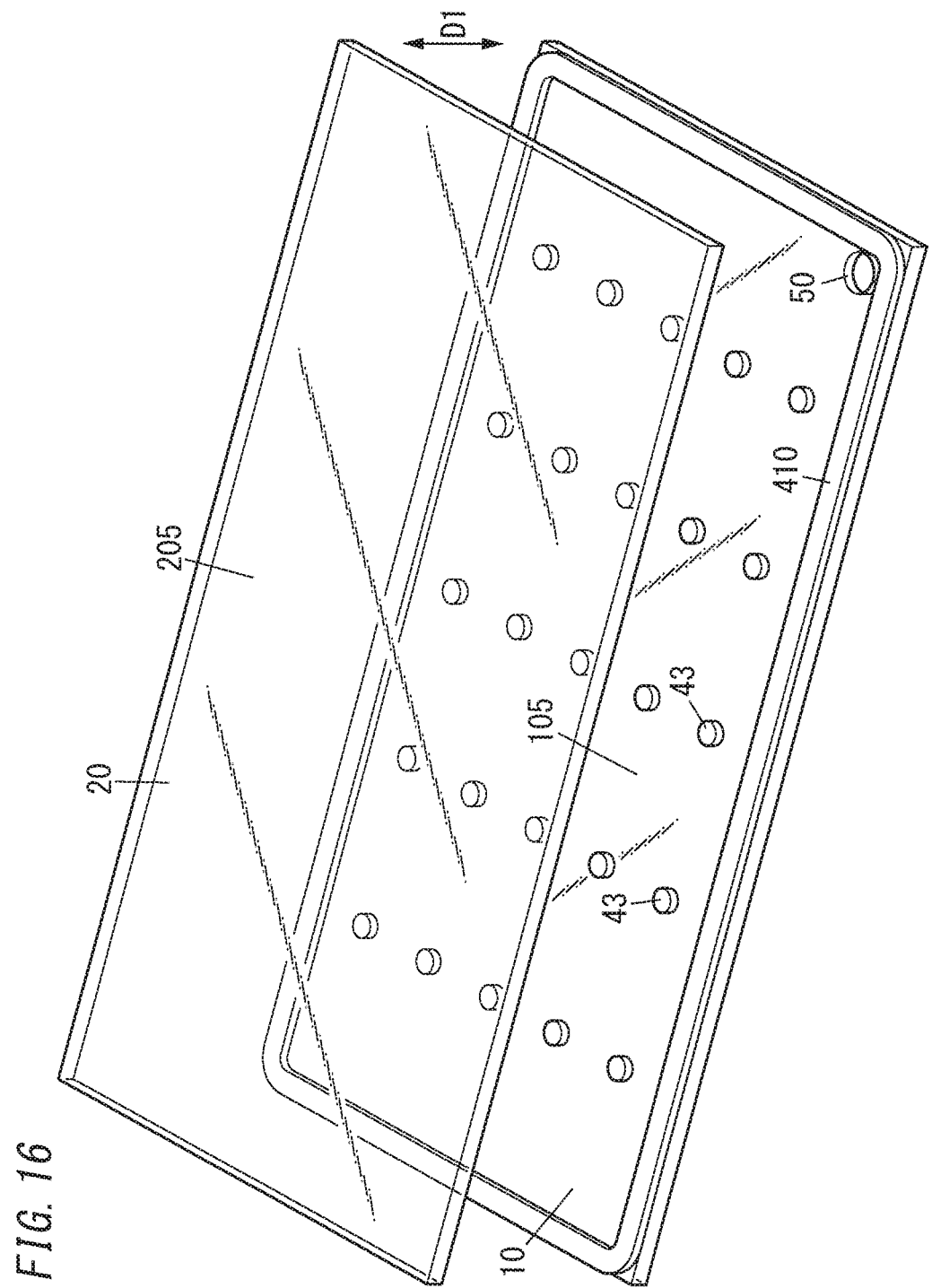
FIG. 16 is a perspective view illustrating how the process is progressing in an arrangement step during the manufacturing of the glass panel unit.
Figure 17:
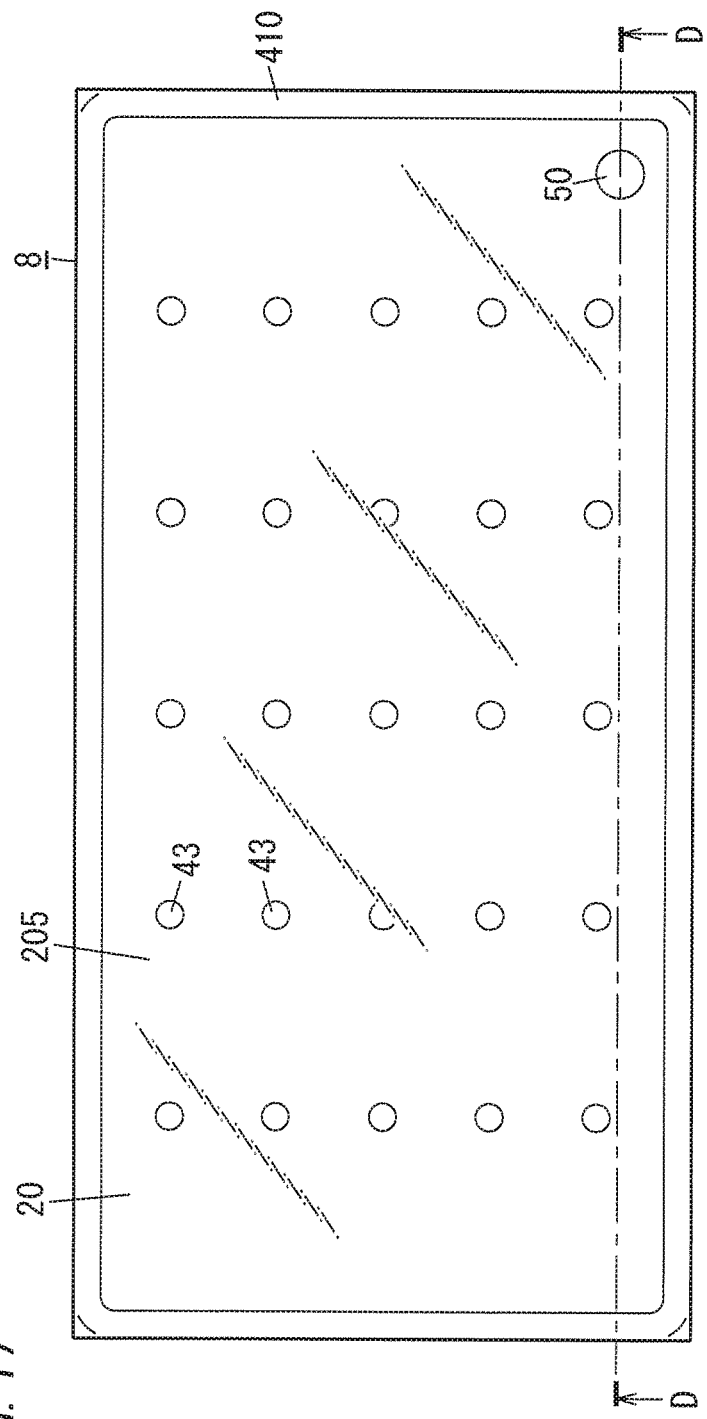
FIG. 17 is a plan view illustrating how the process is progressing in the arrangement step and a bonding step during the manufacturing of the glass panel unit.
Figure 18:
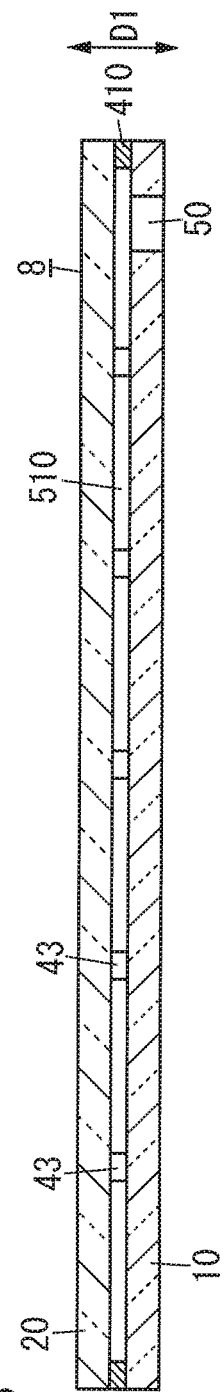
FIG. 18 is a cross-sectional view thereof taken along the plane D-D shown in FIG. 17.

A method for manufacturing the glass panel unit according to the third variation includes an arrangement step, a bonding step, a pressure reducing step, and a sealing step, and allows the work in progress 8 illustrated in FIGS. 17 and 18 to be formed through the arrangement step (see FIG. 16) and the bonding step.

In the arrangement step of this manufacturing method, a plurality of spacers 43 and a first sealant 410 are arranged on the upper surface of a first substrate 10 with an exhaust port 50. No dams 47 are arranged between the first substrate 10 and a second substrate 20. In the glass panel unit manufacturing method according to this third variation, no low emissivity film 450 is included in any of the first and second substrates 10 and 20. However, this is only an example and should not be construed as limiting. Alternatively, at least one of the first and second substrates 10 and 20 may include a low emissivity film 450.

Figure 19:
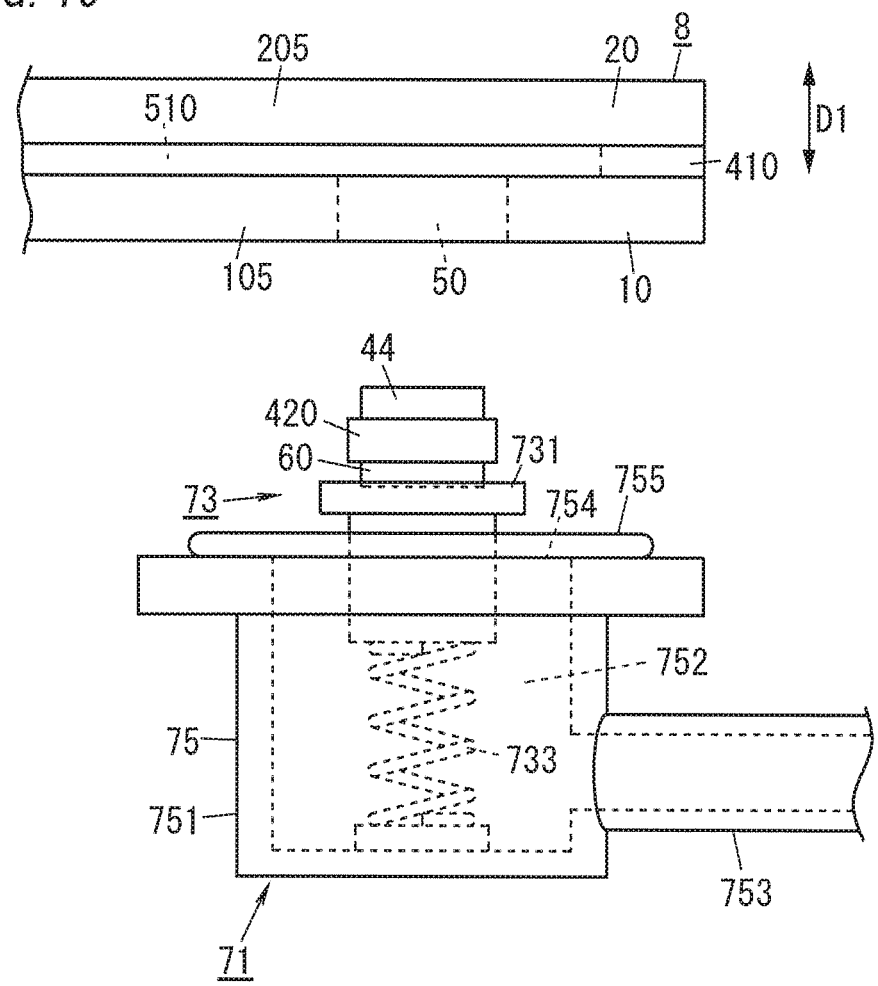
FIG. 19 is a side view illustrating how the process is progressing in a pressure reducing step during the manufacturing of the glass panel unit.
Figure 20:
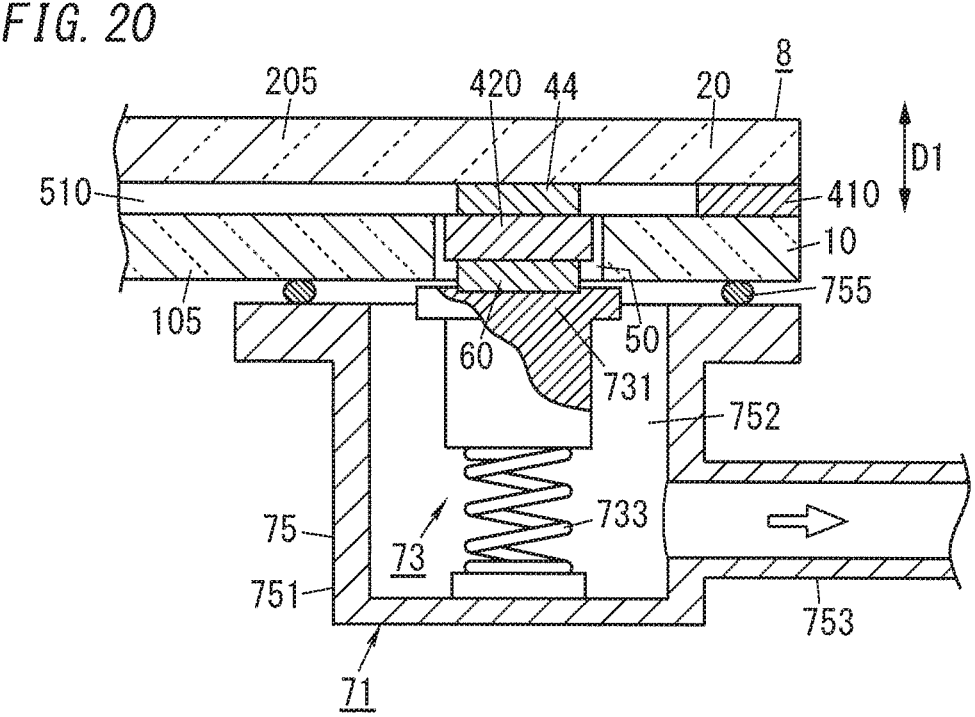
FIG. 20 is a partially cutaway side view illustrating how the process is progressing in the pressure reducing step during the manufacturing of the glass panel unit.
Figure 21:
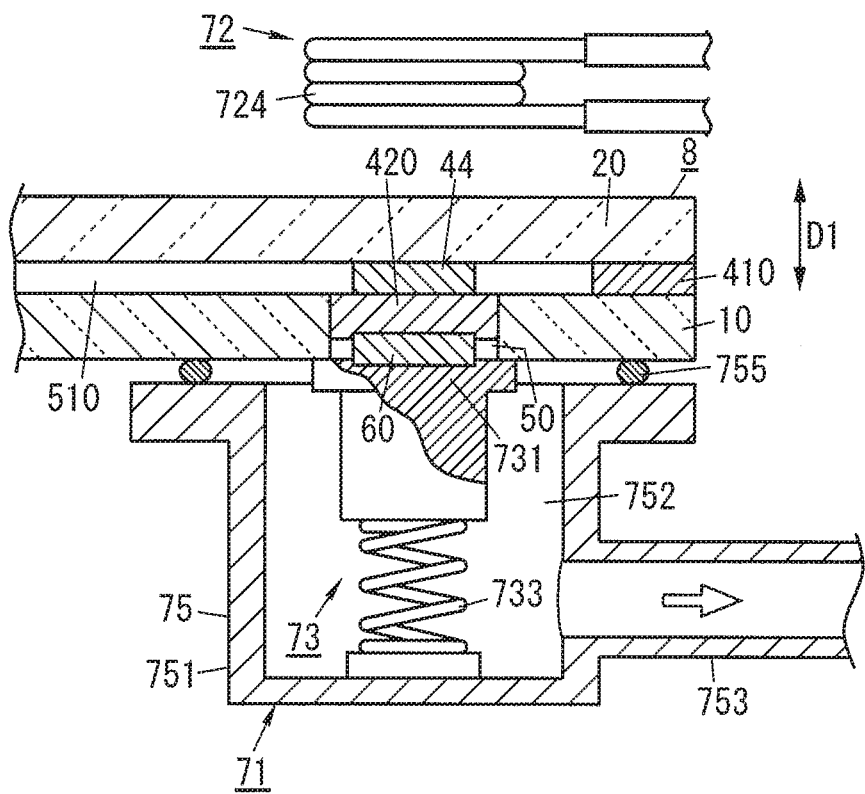
FIG. 21 is a partially cutaway side view illustrating how the process is progressing in a sealing step during the manufacturing of the glass panel unit.

The pressure reducing step and the sealing step may be performed with the system shown in FIGS. 19-21. This system includes: a pressure reducing mechanism 71 with an exhaust head 75; a heating mechanism 72 (see FIG. 21); and a pressing mechanism 73.

On a holder 731 that forms part of the pressing mechanism 73, a press member 60, a second sealant 420, and a getter 44 are stacked in this order one on top of each other. Specifically, the press member 60 is mounted on the upper surface of the holder 731, the second sealant 420 is mounted on the upper surface of the press member 60, and the getter 44 is mounted on the upper surface of the second sealant 420. A spring 733 is connected to the holder 731 to apply biasing force to the holder 731 in a direction away from the inner bottom face of a head body 751 (i.e., upward).

In the pressure reducing step, the exhaust head 75 may be used in the following manner.

First of all, as shown in FIG. 19, the work in progress 8 is loaded into the system with the opening of exhaust port 50 facing downward (such that the first substrate 10 is located under the second substrate 20). The exhaust head 75 is placed in position under the exhaust port 50 with the opening 754 of the head body 751 facing upward. The press member 60, the second sealant 420, and the getter 44, all of which are held by the holder 731, are located over the opening 754.

Each of the press member 60, the second sealant 420, and the getter 44, stacked vertically one on top of each other, has an outside diameter smaller than the diameter of the exhaust port 50. The press member 60 and the getter 44 each have a smaller outside diameter than the second sealant 420.

Next, as shown in FIG. 20, the exhaust head 75 is raised to be pressed against an outer surface of the first substrate 10 (i.e., the lower surface of the first glass pane 105). This allows a space 752 inside the head body 751 to hermetically communicate with the exhaust port 50 via an O-ring 755. At this time, the press member 60, the second sealant 420, and the getter 44 are inserted into the exhaust port 50 and vertically sandwiched between the second substrate 20 and the holder 731 under the biasing force applied by the spring 733.

More specifically, the getter 44 is pressed against the second substrate 20, and the second sealant 420 is vertically sandwiched (i.e., in the thickness direction D1) between the getter 44 and the press member 60 under the biasing force applied by the spring 733. The getter 44 is located at least mostly in the inner space 510, while the second sealant 420 and the press member 60 are located at least mostly in the exhaust port 50.

In this state, the air inside the space 752 of the head body 751 is sucked through a connection pipe 753 (as indicated by the open arrow in FIG. 20). This allows the air in the inner space 510 to be sucked (e.g., allows the inner space 510 to be evacuated).

In the sealing step, the inner space 510 is sealed up, using a heating mechanism 72 including a magnetic field generator 724 as shown in FIG. 21, with a reduced pressure maintained in the inner space 510.

Specifically, with the exhaust head 75 pressed against the first substrate 10 and with a reduced pressure maintained in the inner space 510, the magnetic field generator 724 in the shape of a coil is placed in position and supplied with AC power, thus producing an eddy current in the getter 44 including an electrical conductor (i.e., with electrical conductivity) and the press member 60. The getter 44 and the press member 60 are inductively heated to a predetermined temperature, which may be appropriately controlled with the power supplied to the magnetic field generator 724.

This allows heat to be applied to the second sealant 420, located in the exhaust port 50, from both sides thereof, i.e., from both of the getter 44 and the press member 60, with a reduced pressure maintained in the inner space 510. In addition, this also allows biasing force to be applied from the spring 733 to the second sealant 420 via the press member 60.

The second sealant 420 melts, and is deformed to collapse, under the heat applied from both sides thereof in the thickness direction D1, to be strongly bonded onto the inner peripheral face of the exhaust port 50. As a result, the exhaust port 50 is hermetically sealed up with the second sealant 420 that has melted and been deformed (see FIG. 21). In addition, heating the getter 44 activates the getter 44 as well, which is also beneficial.

According to the method described above, the press member 60 and the getter 44 are both inductively heated. However, this is only an example and should not be construed as limiting. Alternatively, only one of the press member 60 or the getter 44 may be inductively heated.

Optionally, the getter 44 may be omitted. In that case, the second sealant 420, inserted into the exhaust port 50 to come into contact with the second substrate 20 directly, is locally heated with the press member 60 that is being inductively heated and generating heat.

According to the method described above, the exhaust port 50 is provided at only one location of the first substrate 10. Alternatively, a plurality of exhaust ports 50 may be provided at multiple locations of the first substrate 10. Even in such an alternative embodiment, each of those exhaust ports 50 may still be sealed up with the second sealant 420 that has melted and been deformed under the heat by using the pressure reducing mechanism 71, heating mechanism 72 (magnetic field generator 724), and pressing mechanism 73 described above for each of those exhaust ports 50.

In the glass panel unit according to the third variation that has been manufactured by the method described above, the press member 60 (plate 6) is left in the exhaust port 50 as shown in FIGS. 14 and 15. Optionally, the press member 60 may be removed after the exhaust port 50 has been sealed up.

Fourth Variation

Figure 22:
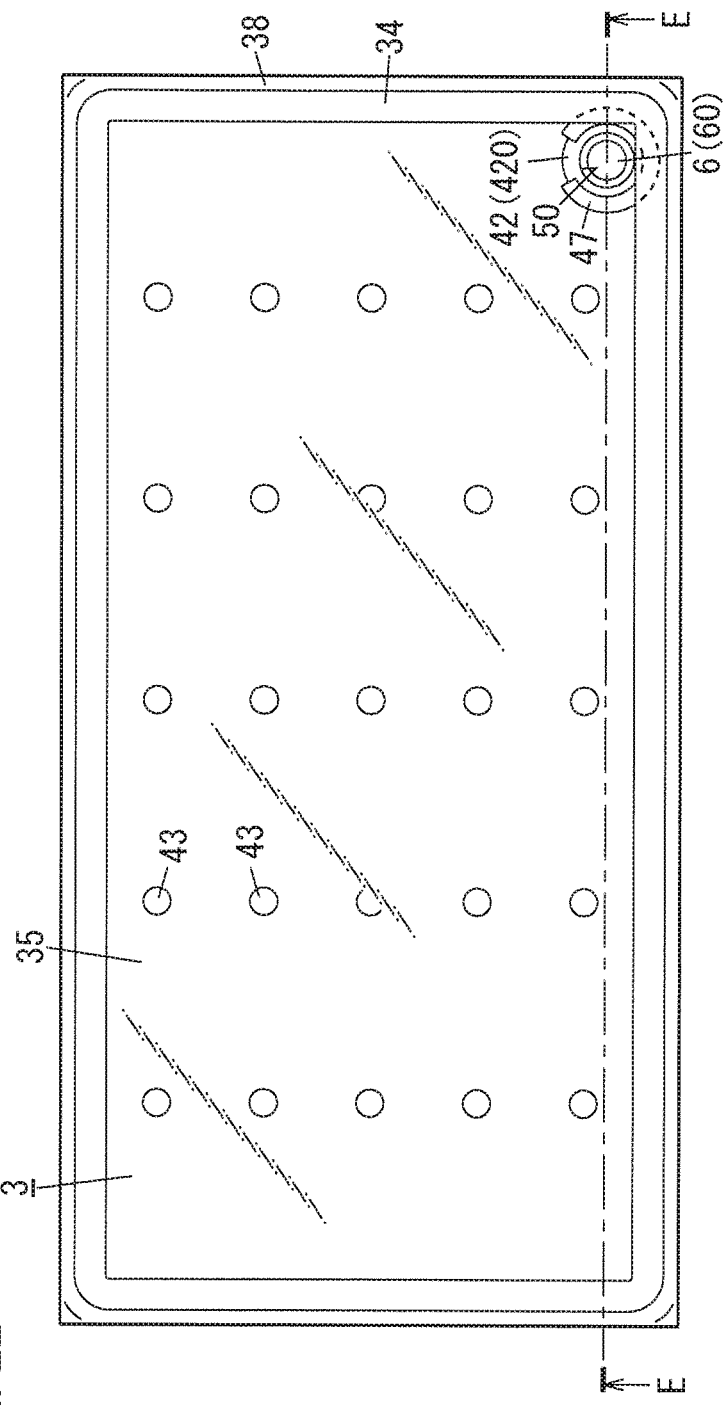
FIG. 22 is a plan view of a glass panel unit according to a fourth variation.
Figure 23:
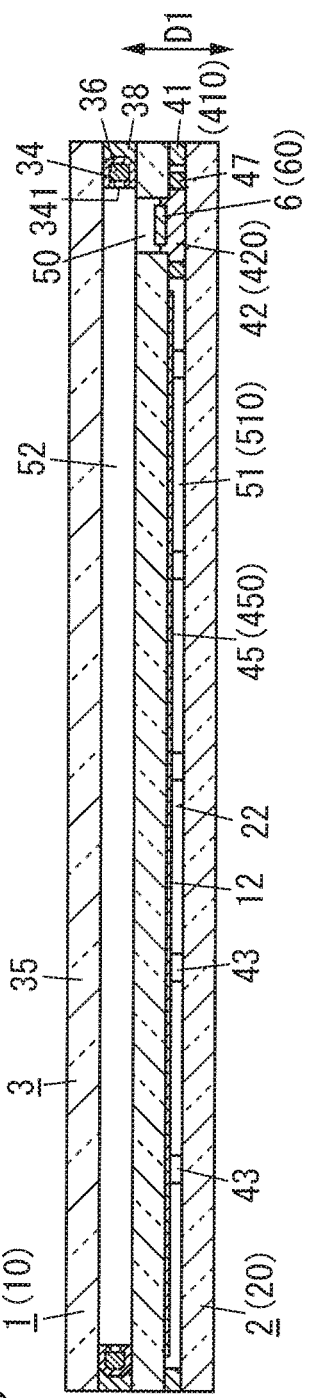
FIG. 23 is a cross-sectional view thereof taken along the plane E-E shown in FIG. 22.

FIGS. 22 and 23 illustrate a glass panel unit according to a fourth variation. This glass panel unit includes not only the first panel 1 and the second panel 2 but also a third panel 3 as well.

In a glass panel unit according to the fourth variation, the third panel 3 is stacked over the first panel 1, and a second inner space 52 is created between the first panel 1 and the third panel 3. However, this is only an example and should not be construed as limiting. Alternatively, the third panel 3 may be stacked over the second panel 2, and the second inner space 52 may be created between the second panel 2 and the third panel 3.

The third panel 3 includes at least a glass pane 35. In the following description, the glass pane 35 will be hereinafter referred to as a "third glass pane 35." The third glass pane 35 may include an appropriate coating.

Between the respective peripheral portions of the third panel 3 and the first panel 1, interposed are a frame-shaped spacer 34 with a hollow and a third sealant 38 formed in a frame shape to cover the outer perimeter of the spacer 34.

The hollow of the spacer 34 is filled with a desiccant 36. The second inner space 52 is a space surrounded entirely with the third sealant 38. The spacer 34 is located in this second inner space 52.

The spacer 34 is made of a metallic material such as aluminum and has ventilation holes 341 on the inner perimeter thereof. The hollow of the spacer 34 communicates, via the ventilation holes 341, with the second inner space 52. The desiccant 36 may be a silica gel, for example. The third sealant 38 may be made of a highly airtight resin such as a silicone resin or butyl rubber.

The second inner space 52 surrounded with the first panel 1, the third panel 3, and the third sealant 38 is a space hermetically sealed out from the outside. The second inner space 52 may be filled with a dry gas (e.g., a dry rare gas such as argon gas or dry air).

A method for manufacturing the glass panel unit according to the fourth variation further includes a second bonding step, in addition to the arrangement step, bonding step, pressure reducing step, and sealing step described above. The second bonding step is the step of hermetically bonding the first panel 1 and the third panel 3 (or the second panel 2 and the third panel 3) with the third sealant 38 with the spacer 34 sandwiched between them.

In the glass panel unit according to the fourth variation, the third panel 3 is stacked over the glass panel unit obtained through the arrangement step, bonding step, pressure reducing step, and sealing step described above. However, this is only an example and should not be construed as limiting. Alternatively, the third panel 3 may be stacked over a cut piece of the glass panel unit obtained through these steps. Still alternatively, the third panel 3 may also be stacked over the glass panel unit according to any one of the first to fourth variations or a cut piece thereof.

Building Component

Next, a building component including the glass panel unit according to the exemplary embodiment will be described.

Figure 24:
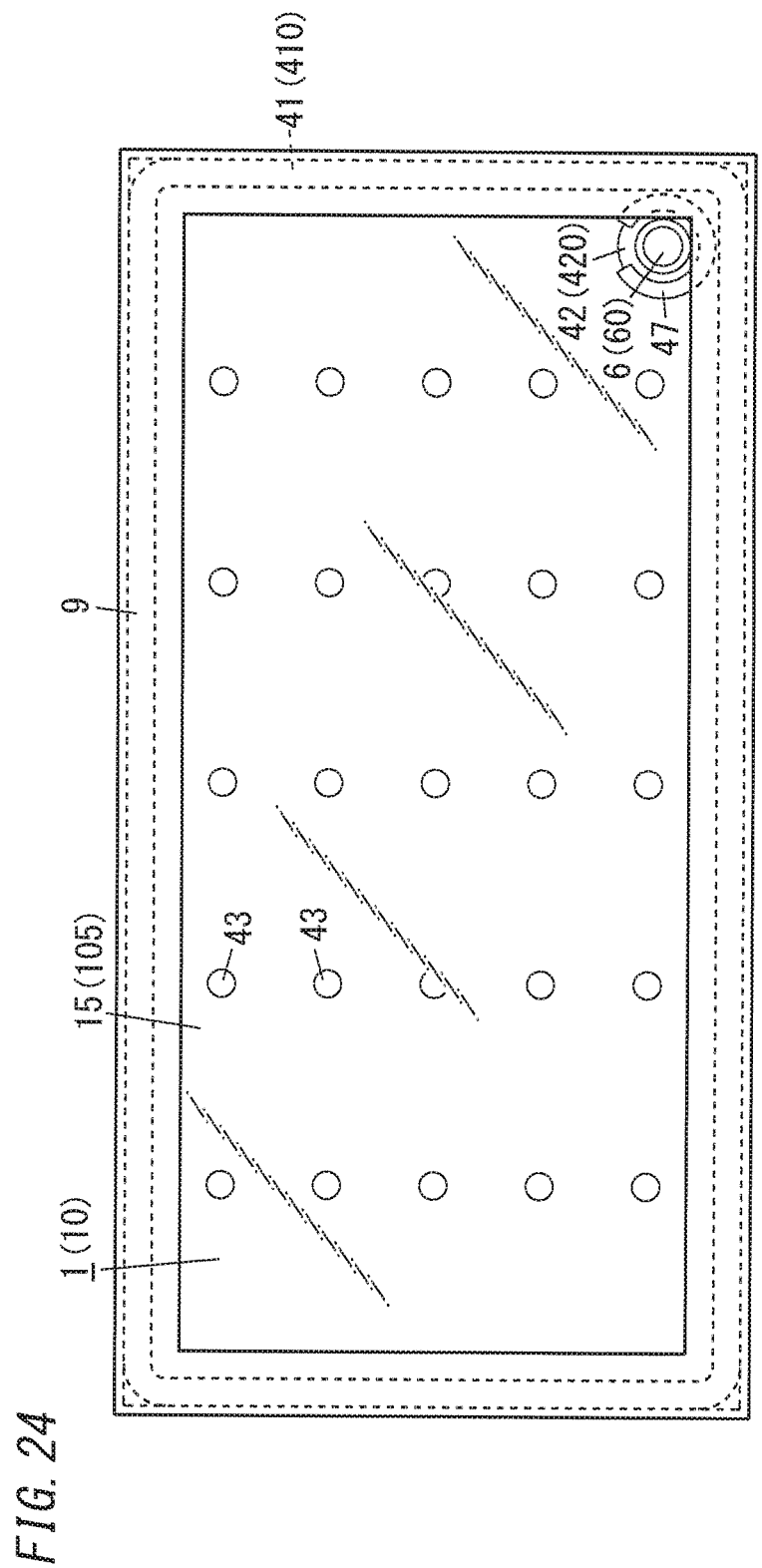
FIG. 24 is a plan view of a building component including a glass pane unit according to the exemplary embodiment.

FIG. 24 illustrates a building component including the glass panel unit according to the exemplary embodiment. This building component is obtained by fitting a building component frame 9 into the glass panel unit according to the exemplary embodiment and exhibits an excellent thermal insulation property.

The building component frame 9 may be a window frame, for example. The building component shown in FIG. 24 is an assembly of window components including the glass panel unit according to the exemplary embodiment. However, this is only an example and should not be construed as limiting. Examples of other building components including the glass panel unit according to the exemplary embodiment include an entrance door and a room door, to name just a few.

A method for manufacturing a building component including the glass panel unit according to the exemplary embodiment includes not only the respective steps of the method for manufacturing the glass panel unit according to the exemplary embodiment but also an assembling step as well.

The assembling step is the step of fitting a rectangular building component frame 9 into a perimeter of the glass panel unit that has been manufactured through the arrangement, bonding, pressure reducing, and sealing steps described above. A building component assembly of window components) manufactured by performing these steps includes a glass panel unit in which the inner space 510 has been created at a reduced pressure, and therefore, exhibits an excellent thermal insulation property.

In the building component shown in FIG. 24, the building component frame 9 is fitted into the glass panel unit that has been manufactured through the arrangement, bonding, pressure reducing, and sealing steps described above. However, this is only an example and should not be construed as limiting. Alternatively, the building component frame 9 may also be fitted into a cut piece of the glass panel unit obtained through these steps. Naturally, the building component frame 9 may also be fitted into the glass panel unit according to any one of the first to fourth variations or a cut piece thereof.

Although some exemplary embodiments and variations of a glass panel unit and a building component including the glass panel unit have been described with reference to the accompanying drawings, those embodiments and variations are only examples and should not be construed as limiting. Rather, those embodiments and variations can be readily modified, replaced or combined in various manners depending on design choice or any other factor.

For example, in the respective methods for manufacturing the glass panel units according to the exemplary embodiment and the first and second variations thereof, the irradiator 720 does not have to be used as the heating mechanism 72. Alternatively, the press member 60 may be heated inductively with a magnetic field generator 724 such as the one adopted in the third variation so that the second sealant 420 may be heated locally with the inductively heated press member 60.

Also, in the respective methods for manufacturing the glass panel units according to the exemplary embodiment and the first and second variations thereof, the irradiator 720 used as the heating mechanism 72 may be replaced with the getter 44 and the magnetic field generator 724 as in the third variation so that the second sealant 420 may be heated locally with the inductively heated getter 44. Furthermore, in the respective methods for manufacturing the glass panel units according to the exemplary embodiment and the first and second variations thereof, the irradiator 720 used as the heating mechanism 72 may be replaced with the magnetic field generator 724 used in the third variation so that the second sealant 420 may be heated locally with the inductively heated press member 60.

Advantages

As can be seen from the foregoing description of embodiments and their variations, a first implementation of a glass panel unit manufacturing method includes an arrangement step, a bonding step, a pressure reducing step, and a sealing step.

The arrangement step includes stacking a first substrate (10), including a glass pane (105), and a second substrate (20), including a glass pane (205), one upon the other with a first sealant (410) in a frame shape interposed between the first substrate (10) and the second substrate (20). The bonding step includes bonding together the first substrate (10) and the second substrate (20) with the first sealant (410) to create an inner space (510) surrounded with the first sealant (410) between the first substrate (10) and the second substrate (20).

The pressure reducing step includes producing a reduced pressure in the inner space (510) through an exhaust port (50) that the first substrate (10) has. The sealing step includes sealing the exhaust port (50) up while maintaining the reduced pressure in the inner space (510).

The sealing step includes irradiating, with a low emissivity film (450) facing the inner space (510), a second sealant (420), inserted into the exhaust port (50), with an infrared ray to locally heat the second sealant (420) and seal the exhaust port (50) up with the second sealant (420) that has melted. The low emissivity film (450) is further included in either the first substrate (10) or the second substrate (20). The infrared ray is externally incident through the second substrate (20) to irradiate the second sealant (420) through a region, where the low emissivity film (450) is nonexistent, of the second substrate (20).

Thus, a glass panel unit manufactured by the glass panel unit manufacturing method according to the first implementation exhibits excellent thermal insulating properties because of the presence of the inner space (510) at the reduced pressure. Furthermore, the exhaust port (50) used for reducing the pressure in the inner space (510) is sealed up with the second sealant (420) that has been heated with an externally incident infrared ray. This eliminates the traces of the exhaust pipe that would cause a problem in conventional structures.

In a second implementation of a glass panel unit manufacturing method, which may be combined with the first implementation of the glass panel unit manufacturing method, the low emissivity film (450) is stacked on the glass pane (105) of the first substrate (10).

Thus, the glass panel unit manufacturing method according to the second implementation allows the second sealant (420) to be irradiated with an infrared ray efficiently through the second substrate (20) with no low emissivity film (450).

In a third implementation of a glass panel unit manufacturing method, which may be combined with the second implementation of the glass panel unit manufacturing method, the low emissivity film (450) is partially removed from at least a circumferential portion, surrounding an opening formed by the exhaust port (50), of the glass pane (105) of the first substrate (10).

Thus, the glass panel unit manufacturing method according to the third implementation allows the second sealant (420), which has melted under the heat, to be bonded directly and strongly onto the glass pane (105) at the circumferential portion surrounding the opening of the exhaust port (50).

In a fourth implementation of a glass panel unit manufacturing method, which may be combined with the first implementation of the glass panel unit manufacturing method, the low emissivity film (450) is stacked on the glass pane (205) of the second substrate (20), and the low emissivity film (450) is partially removed from at least a portion, facing the exhaust port (50), of the second substrate (20).

Thus, the glass panel unit manufacturing method according to the fourth implementation allows the second sealant (420) to be irradiated efficiently with an infrared ray through a portion, from which the low emissivity film (450) has been removed, of the second substrate (20). In addition, the glass panel unit manufacturing method according to the fourth implementation also allows the second sealant (420), which has melted under the heat, to be bonded directly and strongly onto the glass pane (205) at a portion, facing the exhaust port (50), of the second substrate (20).

In a fifth implementation of a glass panel unit manufacturing method, which may be combined with any one of the first to fourth implementations of the glass panel unit manufacturing method, the infrared ray is a near infrared ray, and the second sealant (420) has a near infrared absorbance of 30% or more.

Thus, the glass panel unit manufacturing method according to the fifth implementation allows the second sealant (420) to be irradiated with a near infrared ray and thereby heated locally and efficiently.

A sixth implementation of a glass panel unit manufacturing method includes a second bonding step of bonding a third panel (3) including a glass pane (35), via a third sealant (38) in a frame shape, onto either a glass panel unit manufactured by the glass panel unit manufacturing method according to any one of the first to fifth implementations or a cut piece thereof.

Thus, the glass panel unit manufacturing method according to the sixth implementation provides a glass panel unit with an even better thermal insulation property.

A first implementation of a building component manufacturing method includes an assembling step of fitting a building component frame (9) into either a glass panel unit manufactured by the glass panel unit manufacturing method according to any one of the first to sixth implementations or a cut piece thereof.

Thus, the building component manufacturing method according to the first implementation allows for efficiently manufacturing a building component including a glass panel unit having an excellent thermal insulating property and no traces of the exhaust pipe.

A first implementation of a glass panel unit manufacturing system is configured to manufacture a glass panel unit out of a work in progress (8), having an inner space (510) and an exhaust port (50) communicating with the inner space (510), by sealing the exhaust port (50) up while maintaining a reduced pressure in the inner space (510).

The work in progress (8) includes: a first substrate (10) including a glass pane (105) and having the exhaust port (50); and a second substrate (20) including a glass pane (205). The first substrate (10) and the second substrate (20) are bonded together with a first sealant (410) in a frame shape. The inner space (510) is created between the first substrate (10) and the second substrate (20) so as to be surrounded with the first sealant (410). A low emissivity film (450) is further included in either the first substrate (10) or the second substrate (20) and arranged to face the inner space (510).

The system includes a pressure reducing mechanism (71) and an irradiator (720). The pressure reducing mechanism (71) is configured to maintain the reduced pressure in the inner space (510) through the exhaust port (50). The irradiator (720) is configured to irradiate a second sealant (420), inserted into the exhaust port (50), with an infrared ray through a region, where the low emissivity film (450) is nonexistent, of the second substrate (20).

Thus, a glass panel unit manufactured by the glass panel unit manufacturing system according to the first implementation exhibits an excellent thermal insulating property because of the presence of the inner space (510) at the reduced pressure. In addition, the exhaust port (50) used for reducing the pressure in the inner space (510) is subsequently sealed up with the second sealant (420) heated by being irradiated with an externally incident infrared ray. This eliminates the traces of the exhaust pipe that would cause a problem in conventional structures.

In a second implementation of a glass panel unit manufacturing system, which may be combined with the first implementation of the glass panel unit manufacturing system, the low emissivity film (450) of the work in progress (8) is included in only the first substrate (10), out of the first substrate (10) and the second substrate (20).

Thus, the glass panel unit manufacturing system according to the second implementation allows the second sealant (420) to be irradiated with an infrared ray efficiently through the second substrate (20) with no low emissivity film (450).

In a third implementation of a glass panel unit manufacturing system, which may be combined with the first implementation of the glass panel unit manufacturing system, the low emissivity film (450) of the work in progress (8) is stacked on the glass pane (205) of the second substrate (20) and is nonexistent in at least a portion, facing the exhaust port (50), of the second substrate (20). In the system, the irradiator (720) is configured to irradiate the second sealant (420) with the infrared ray through the portion, where the low emissivity film (450) is nonexistent, of the second substrate (20).

Thus, the glass panel unit manufacturing system according to the third implementation allows the second sealant (420) to be irradiated efficiently with an infrared ray through a portion, where the low emissivity film (450) is nonexistent, of the second substrate (20). In addition, the glass panel unit manufacturing system according to the third implementation also allows the second sealant (420), which has melted under the heat, to be bonded directly and strongly onto the glass pane (205) at a portion, facing the exhaust port (50), of the second substrate (20).

In a fourth implementation of a glass panel unit manufacturing system, which may be combined with any one of the first to third implementations of the glass panel unit manufacturing system, the infrared ray is a near infrared ray.

Thus, the glass panel unit manufacturing system according to the fourth implementation allows the second sealant (420) to be irradiated with a near infrared ray and thereby heated locally and efficiently.

A first implementation of a glass panel unit includes a first panel (1), a second panel (2), a first sealing portion (41) in a frame shape, an exhaust port (50), and a second sealing portion (42).

The first panel (1) includes a glass pane (15). The second panel (2) includes a glass pane (25) and is arranged to face the first panel (1). The first sealing portion (41) in the frame shape hermetically bonds together respective peripheral portions of the first panel (1) and the second panel (2). The exhaust port (50) is provided for the first panel (1). The second sealing portion (42) seals the exhaust port (50) up to create an inner space (51), having a reduced pressure and surrounded with the first sealing portion (41), between the first panel (1) and the second panel (2).

Either the first panel (1) or the second panel (2) further includes a low emissivity film (45) facing the inner space (51). The second sealing portion (42) is bonded onto a region, where the low emissivity film (45) is nonexistent, of the glass pane (15) of the first panel (1), and onto a region, where the low emissivity film (45) is nonexistent, of the glass pane (25) of the second panel (2).

Thus, in the glass panel unit according to the first implementation, the exhaust port (50) used for reducing the pressure in the inner space (51) is sealed up with the second sealing portion (42). This eliminates the traces of the exhaust pipe that would cause a problem in conventional structures. In addition, the glass panel unit according to the first implementation allows the second sealing portion (42) to be bonded directly and strongly onto the glass pane (15) of the first panel (1) and the glass pane (25) of the second panel (2).

In a second implementation of a glass panel unit, which may be combined with the first implementation of the glass panel unit, the low emissivity film (45) is stacked on the glass pane (15) of the first panel (1). The low emissivity film (45) is nonexistent in a circumferential portion, surrounding an opening formed by the exhaust port (50), of the glass pane (15) of the first panel (1). The second sealing portion (42) is bonded onto the circumferential portion of the glass pane (15) of the first panel (1) and onto a portion, facing the exhaust port (50) and the circumferential portion, of the glass pane (25) of the second panel (2).

Thus, the glass panel unit according to the second implementation allows the low emissivity film (45) included in the first panel (1) to reduce the transfer of heat due to radiation, and also allows the second sealing portion (42) that seals the exhaust port (50) up to be strongly bonded onto the glass pane (15) of the first panel (1) and the glass pane (25) of the second panel (2).

In a third implementation of a glass panel unit, which may be combined with the first implementation of the glass panel unit, the low emissivity film (45) is stacked on the glass pane (25) of the second panel (2). The low emissivity film (45) is nonexistent in a portion, facing the exhaust port (50) and a circumferential portion, of the glass pane (25) of the second panel (2). The circumferential portion surrounds an opening formed by the exhaust port (50). The second sealing portion (42) is bonded onto the portion of the glass pane (25) of the second panel (2) and onto the circumferential portion of the glass pane (15) of the first panel (1).

Thus, the glass panel unit according to the third implementation allows the low emissivity film (45) included in the second panel (2) to reduce the transfer of heat due to radiation, and also allows the second sealing portion (42) that seals the exhaust port (50) up to be strongly bonded onto the glass pane (15) of the first panel (1) and the glass pane (25) of the second panel (2).

REFERENCE SIGNS LIST

1 First Panel
10 First Substrate
15 (First) Glass Pane
105 (First) Glass Pane
2 Second Panel
20 Second Substrate
25 (Second) Glass Pane
205 (Second) Glass Pane
3 Third Panel
38 Third Sealant
41 First Sealing Portion
410 First Sealant
42 Second Sealing Portion
420 Second Sealant
45 Low Emissivity
450 Low Emissivity Film
50 Exhaust Port
51 Inner Space
510 Inner Space
71 Pressure Reducing Mechanism
720 Irradiator
8 Work in Progress
9 Building Component Frame

The invention claimed is:

1. A glass panel unit manufacturing method comprising:
an arrangement step of stacking a first substrate, including a glass pane, and a second substrate, including a glass pane, one upon the other with a first sealant in a frame shape interposed between the first substrate and the second substrate;
a bonding step of bonding together the first substrate and the second substrate with the first sealant to create an inner space surrounded with the first sealant between the first substrate and the second substrate;

a pressure reducing step of producing a reduced pressure in the inner space through an exhaust port that the first substrate has; and a sealing step of sealing the exhaust port up while maintaining the reduced pressure in the inner space, the sealing step including irradiating, with a low emissivity film facing the inner space, a second sealant, inserted into the exhaust port, with an infrared ray to locally heat the second sealant and seal the exhaust port up with the second sealant that has melted, the low emissivity film being further included in either the first substrate or the second substrate, the infrared ray being externally incident through the second substrate to irradiate the second sealant through a region, where the low emissivity film is nonexistent, of the second substrate.

2. The glass panel unit manufacturing method of claim 1, wherein
the low emissivity film is stacked on the glass pane of the first substrate.

3. The glass panel unit manufacturing method of claim 2, wherein
the low emissivity film is partially removed from at least a circumferential portion, surrounding an opening formed by the exhaust port, of the glass pane of the first substrate.

4. The glass panel unit manufacturing method of claim 1, wherein
the low emissivity film is stacked on the glass pane of the second substrate, and
the low emissivity film is partially removed from at least a portion, facing the exhaust port, of the second substrate.

5. The glass panel unit manufacturing method of claim 1, wherein
the infrared ray is a near infrared ray, and
the second sealant has a near infrared absorbance of 30% or more.

6. A glass panel unit manufacturing method comprising a second bonding step of bonding a third panel, via a third sealant in a frame shape, onto either a glass panel unit manufactured by the glass panel unit manufacturing method of claim 1 or a cut piece of the glass panel unit.

7. A building component manufacturing method comprising an assembling step of fitting a building component frame into either a glass panel unit manufactured by the glass panel unit manufacturing method of claim 1 or a cut piece of the glass panel unit.

* * * * *